(12) United States Patent
Li et al.

(10) Patent No.: US 12,713,458 B2
(45) Date of Patent: Aug. 18, 2026

(54) COMMUNICATIONS METHOD AND APPARATUS

(71) Applicant: Yinwang Intelligent Technologies Co., Ltd., Shenzhen (CN)

(72) Inventors: Chao Li, Chengdu (CN); Xingxin Zhang, Chengdu (CN); Pengxin Bao, Chengdu (CN); Xuehuan Wang, Chengdu (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 589 days.

(21) Appl. No.: 17/976,430

(22) Filed: Oct. 28, 2022

(65) Prior Publication Data

US 2023/0057007 A1 Feb. 23, 2023

Related U.S. Application Data

(63) Continuation of application No. PCT/CN2020/087919, filed on Apr. 29, 2020.

(51) Int. Cl.
*H04W 74/0808* (2024.01)
*H04L 1/00* (2006.01)
(Continued)

(52) U.S. Cl.
CPC ....... *H04W 74/0808* (2013.01); *H04L 1/0008* (2013.01); *H04L 1/1614* (2013.01); *H04W 74/0866* (2013.01)

(58) Field of Classification Search
CPC ......... H04W 74/0808; H04W 74/0866; H04W 4/48; H04W 28/02; H04W 28/065;
(Continued)

(56) References Cited

U.S. PATENT DOCUMENTS

2013/0103780 A1* 4/2013 Panther ................. H04L 67/568 709/213
2017/0220502 A1 8/2017 Kessler et al.
(Continued)

FOREIGN PATENT DOCUMENTS

CN 108809582 A 11/2018
CN 109391378 A 2/2019
(Continued)

OTHER PUBLICATIONS

Fujitsu, "Remaining issues on physical layer structure for sidelink," 3GPP TSG RAN WG1 #100, R1-2000545, e-Meeting, Feb. 24-Mar. 6, 2020, 4 pages.

*Primary Examiner* — Mohammad S Adhami
*Assistant Examiner* — Samuel Dilan Rutnam
(74) *Attorney, Agent, or Firm* — Conley Rose, P.C.

(57) ABSTRACT

In a communications method, a control node determines first configuration information where the first configuration information belongs to a configuration information set. The configuration information set includes at least one piece of configuration information to indicate whether a first slave node performs, in some or all of time units included in a preset time period, an operation corresponding to the first configuration information. The method is applied to coordination management of communication between slave nodes in a transmission system having a plurality of service requirements and implements flexible configuration of each slave node in the transmission system controlled by the control node.

20 Claims, 10 Drawing Sheets

(51) Int. Cl.
*H04L 1/1607* (2023.01)
*H04W 74/08* (2009.01)

(58) Field of Classification Search
CPC .............. H04W 72/0446; H04W 84/20; H04L 1/0008; H04L 1/1614; H04L 1/1671; H04L 1/1864; H04L 5/0092; H04L 1/18; H04L 5/1469
See application file for complete search history.

(56) References Cited

U.S. PATENT DOCUMENTS

| | | | | |
|---|---|---|---|---|
| 2017/0222790 | A1 | 8/2017 | Hooper et al. | |
| 2017/0222829 | A1 | 8/2017 | Kessler et al. | |
| 2019/0190675 | A1* | 6/2019 | Takeda | H04L 27/2602 |
| 2019/0363843 | A1* | 11/2019 | Gordaychik | H04W 72/044 |
| 2020/0053745 | A1 | 2/2020 | Luo et al. | |
| 2020/0077429 | A1 | 3/2020 | Ma et al. | |
| 2020/0229230 | A1 | 7/2020 | Wang et al. | |
| 2020/0344755 | A1 | 10/2020 | Shen | |
| 2022/0369310 | A1 | 11/2022 | Shen | |

FOREIGN PATENT DOCUMENTS

| | | | | | |
|---|---|---|---|---|---|
| CN | 109644461 | A | | 4/2019 | |
| EP | 3739993 | A1 | * | 11/2020 | H04L 5/0053 |
| WO | 03071722 | A1 | | 8/2003 | |
| WO | 2019136715 | A1 | | 7/2019 | |
| WO | WO-2019185008 | A1 | * | 10/2019 | H04W 72/1268 |

* cited by examiner

COMMUNICATIONS METHOD AND APPARATUS

CROSS-REFERENCE TO RELATED APPLICATIONS

This is a U.S. continuation of International Patent Application No. PCT/CN2020/087919, filed on Apr. 29, 2020, the disclosure of which is hereby incorporated by reference in its entirety.

TECHNICAL FIELD

This disclosure relates to the field of communications technologies, and in particular, to a communications method and apparatus.

BACKGROUND

With continuous development of the automotive industry, an increasing quantity of requirements are put forward for automotive functions, such as in-vehicle video entertainment, noise reduction, and voice control. Vehicle-mounted electronic devices are accordingly increasing, and in-vehicle electronic systems are increasingly large. A controller of a vehicle-mounted electronic device needs to upload or download sampling data of different vehicle-mounted electronic devices. However, different vehicle-mounted electronic devices usually have different sampling frequencies due to different services. For example, a sampling frequency of a microphone is usually 44.1 kilohertz (kHz) or 48 kHz, and a sampling frequency of a speaker is usually 24 KHz. In addition, sensor data such as temperature, humidity, or vibration is usually a burst service and therefore usually has a lower sampling frequency such as 1 Hz.

Currently, how to configure a data transmission solution adapted to a multi-service hybrid transmission requirement for an in-vehicle electronic system is a problem to be urgently resolved.

SUMMARY

This disclosure provides a communications method and apparatus, to provide a data transmission method adapted to a service requirement of an electronic device.

According to a first aspect, this disclosure provides a communications method. The method may be adapted to a control node, and the control node may be a control node in an in-vehicle communications system. In the method, the control node determines first configuration information, where the first configuration information belongs to a configuration information set, the configuration information set includes at least one piece of configuration information, and the first configuration information is used to indicate whether a first slave node performs, in some or all of time units included in a preset time period, an operation corresponding to the first configuration information; and the control node sends the first configuration information to the first slave node.

According to the foregoing method, the control node may configure corresponding first configuration information for each slave node based on a sampling frequency of the slave node to indicate an operation that may need to be performed by the slave node in some or all of time units in a preset time period, so as to meet a service requirement of the slave node. This is applicable to coordination and management of communication between slave nodes in a transmission system having a plurality of service requirements, and implements flexible configuration of each slave node in the transmission system by the control node.

In a possible design, the first configuration information is a bitmap, and bits included in the bitmap are in a one-to-one correspondence with some or all of the time units included in the preset time period. Any bit included in the bitmap is used to indicate whether to perform, on a corresponding time unit, the operation corresponding to the first configuration information.

In a possible design, the configuration information set includes one or more of the following configuration information: uplink time unit activation information, uplink time unit demodulation information, uplink time unit forwarding information, uplink time unit padding information, downlink time unit activation information, downlink time unit demodulation information, downlink time unit forwarding information, and downlink time unit padding information.

In a possible design, the preset time period includes a downlink time domain resource and/or an uplink time domain resource. The downlink time domain resource includes a time domain resource used to carry a downlink pilot, a time domain resource used to carry a downlink frame header, and at least one first time unit used to carry periodic downlink regular data; and the uplink time domain resource includes a time domain resource used to carry an uplink pilot, a time domain resource used to carry an uplink frame header, and at least one second time unit used to carry periodic uplink regular data.

In a possible design, the downlink time domain resource further includes at least one third time unit used to carry downlink feedback information and/or at least one fourth time unit used to carry burst downlink random data; and the uplink time domain resource further includes at least one fifth time unit used to carry uplink feedback information and/or at least one sixth time unit used to carry burst uplink random data.

In a possible design, the control node sends second configuration information to the first slave node, where the second configuration information is used to indicate information about the at least one fourth time unit; and/or the second configuration information is used to indicate information about the at least one sixth time unit. The information includes location information and/or quantity information.

In a possible design, the second configuration information is further used to indicate whether the first slave node activates an overwrite function within the preset period. The overwrite function includes that downlink random data of a second slave node may be overwritten with downlink random data of the first slave node; and/or the overwrite function includes that uplink random data of a third slave node may be overwritten with uplink random data of the first slave node. The control node, the second slave node, the first slave node, and the third slave node are connected in series. The second slave node is an upper-level node of the first slave node, and the third slave node is a lower-level node of the first slave node.

In a possible design, the control node sends second indication information, where the second indication information is used to indicate a first quantity of seventh time units that do not carry downlink random data in the at least one fourth time unit.

According to the foregoing method, a slave node having a random data transmission requirement may determine, based on the second indication information, a location of a time unit that can be used to carry random data. In addition, the slave node may further determine, based on the second indication information, a time unit that does not carry random data, to stop receiving and forwarding. This achieves energy saving.

In a possible design, that the control node sends second indication information includes: The control node sends the second indication information on the time domain resource used to carry a downlink frame header.

In a possible design, the control node receives third indication information on the time domain resource used to carry an uplink frame header, where the third indication information is used to indicate a second quantity of at least one eighth time unit that does not carry uplink random data in the at least one sixth time unit.

In a possible design, that the third time unit is in a one-to-one correspondence with the sixth time unit further includes: at least one third time unit in a current preset time period in two adjacent preset time periods is used to carry downlink feedback information of uplink random data carried in at least one sixth time unit in a previous preset time period, where the downlink feedback information is used to indicate that the uplink random data carried in the at least one sixth time unit is successfully received or not successfully received.

According to the foregoing manner, feedback information is used to indicate whether random data is successfully received; and if the random data is not successfully received, a slave node may be indicated to retransmit the random data. This avoids missing of random data, affects a system function, and improves system running security.

In a possible design, the method further includes: The control node sends third configuration information to the first slave node, where the third configuration information is used to indicate an identifier of the preset time period, or the third configuration information is used to indicate a time interval between two adjacent preset time periods. Optionally, the third configuration information belongs to the configuration information set.

According to the foregoing manner, different validity periods may be configured for slave nodes having different sampling frequencies or service requirements. This is applicable to flexible control and management of data transmission on each slave node in a transmission system having a plurality of service requirements, and improves data transmission efficiency.

According to a second aspect, this disclosure provides a communications method. The communications method may be adapted to a first slave node, and the first slave node may be a slave node in an in-vehicle communications system. In the method, the first slave node receives first configuration information from a control node, where the first configuration information belongs to a configuration information set, the configuration information set includes at least one piece of configuration information, and the first configuration information is used to indicate whether the first slave node performs, in some or all of time units included in a preset time period, an operation corresponding to the first configuration information; the first slave node determines, based on the first configuration information, an operation on each time unit included in the preset time period; and the first slave node performs the determined operation when the time unit is reached.

In a possible design, the first configuration information is a bitmap, and bits included in the bitmap are in a one-to-one correspondence with some or all of the time units included in the preset time period. Any bit included in the bitmap is used to indicate whether to perform, on a corresponding time unit, the operation corresponding to the first configuration information.

In a possible design, the configuration information set includes one or more of the following configuration information: uplink time unit activation information, uplink time unit demodulation information, uplink time unit forwarding information, uplink time unit padding information, downlink time unit activation information, downlink time unit demodulation information, downlink time unit forwarding information, and downlink time unit padding information.

In a possible design, the preset time period includes a downlink time domain resource and/or an uplink time domain resource. The downlink time domain resource includes a time domain resource used to carry a downlink pilot, a time domain resource used to carry a downlink frame header, and a first time unit used to carry downlink regular data; and the uplink time domain resource includes a time domain resource used to carry an uplink pilot and an uplink frame header, and a second time unit used to carry uplink regular data.

In a possible design, the downlink time domain resource further includes a third time unit used to carry downlink feedback information and/or a fourth time unit used to carry burst downlink random data; and the uplink time domain resource further includes a fifth time unit used to carry uplink feedback information and/or a sixth time unit used to carry burst uplink random data.

In a possible design, the first slave node receives second configuration information from the control node, where the second configuration information is used to indicate information about at least one fourth time unit; and/or the second configuration information is used to indicate information about at least one sixth time unit. The information includes location information and/or quantity information.

In a possible design, the second configuration information is further used to indicate whether the first slave node activates an overwrite function within the preset period. The overwrite function includes that downlink random data of a second slave node may be overwritten with downlink random data of the first slave node; and/or the overwrite function includes that uplink random data of a third slave node may be overwritten with uplink random data of the first slave node. The control node, the second slave node, the first slave node, and the third slave node are connected in series. The second slave node is an upper-level node of the first slave node, and the third slave node is a lower-level node of the first slave node.

In a possible design, the first slave node receives second indication information, where the second indication information is used to indicate a first quantity of at least one seventh time unit that does not carry downlink random data in the at least one fourth time unit; and/or the first slave node receives third indication information, where the third indication information is used to indicate a second quantity of at least one eighth time unit that does not carry uplink random data in the at least one sixth time unit. The control node, the second slave node, the first slave node, and the third slave node are connected in series. The second slave node is an upper-level node of the first slave node, and the third slave node is a lower-level node of the first slave node.

According to the foregoing method, a slave node having a random data transmission requirement may determine, based on the second indication information, a location of a time unit that can be used to carry random data. In addition, the slave node may further determine, based on the second indication information, a time unit that does not carry random data, to stop receiving and forwarding. This achieves energy saving.

In a possible design, that the first slave node receives second configuration information includes: The first slave node receives the second indication information on the time domain resource used to carry a downlink frame header. That the first slave node receives third indication information includes: The first slave node receives the third indication information from the third slave node on the time domain resource used to carry an uplink frame header.

In a possible design, the first slave node pads the uplink random data of the first slave node to one or more time units in the at least one eighth time unit based on the third indication information; and/or if the second configuration information indicates that the overwrite function is activated, the first slave node pads the uplink random data of the first slave node to one or more time units in at least one ninth time unit, where the at least one ninth time unit is a time unit that has carried uplink random data of at least one third slave node in the at least one sixth time unit.

In a possible design, that the first slave node pads the uplink random data of the first slave node to one or more time units in the eighth time unit based on the third indication information includes: If the second quantity is not less than a third quantity of time units required for the uplink random data of the first slave node, the first slave node pads the uplink random data to the one or more time units in the eighth time unit; or if the second quantity is less than the third quantity and the second quantity is greater than 0, the first slave node pads a part of the uplink random data to the eighth time unit.

The ninth time unit further carries information about a first priority of the uplink random data of the third slave node. That the first slave node pads the uplink random data of the first slave node to one or more time units in at least one ninth time unit includes: If a second priority of the uplink random data of the first slave node is higher than the first priority, the first slave node pads a part or all of the uplink random data of the first slave node to the one or more time units in the ninth time unit.

In a possible design, the first slave node pads the downlink random data of the first slave node to one or more time units in the at least one seventh time unit based on the second indication information; and/or if the second configuration information indicates that the overwrite function is activated, the first slave node pads the downlink random data of the first slave node to one or more time units in at least one tenth time unit, where the at least one tenth time unit is a time unit that has carried downlink random data of at least one second slave node in the at least one fourth time unit.

In a possible design, that the first slave node pads the downlink random data of the first slave node to one or more time units in the seventh time unit based on the second indication information includes: If the first quantity is not less than a fourth quantity of time units required for the downlink random data of the first slave node, the first slave node pads the downlink random data to the one or more time units in the seventh time unit; or if the first quantity is less than the fourth quantity and the first quantity is greater than 0, the first slave node pads a part of the downlink random data to the seventh time unit.

The tenth time unit further carries information about a third priority of the downlink random data of the second slave node. That the first slave node pads the downlink random data of the first slave node to one or more time units in at least one tenth time unit includes: If a second priority of the downlink random data of the first slave node is higher than the third priority, the first slave node pads a part or all of the downlink random data of the first slave node to the one or more time units in the tenth time unit.

In a possible design, that the third time unit is in a one-to-one correspondence with the sixth time unit further includes: at least one third time unit in a current preset time period in two adjacent preset time periods is used to carry downlink feedback information of uplink random data carried in at least one sixth time unit in a previous preset time period, where the downlink feedback information is used to indicate that the uplink random data carried in the at least one sixth time unit is successfully received or not successfully received.

That the fifth time unit is in a one-to-one correspondence with the fourth time unit further includes: at least one fifth time unit in the preset time period is used to carry uplink feedback information of downlink random data carried in at least one fourth time unit in the same preset time period, where the uplink feedback information is used to indicate that the uplink random data carried in the at least one fourth time unit is successfully received or not successfully received.

According to the foregoing manner, feedback information is used to indicate whether random data is successfully received; and if the random data is not successfully received, a slave node may be indicated to retransmit the random data. This avoids missing of random data, affects a system function, and improves system running security.

In a possible design, the first slave node receives third configuration information from the control node, where the third configuration information is used to indicate an identifier of the preset time period, or the third configuration information is used to indicate a time interval between two adjacent preset time periods.

According to the foregoing manner, different validity periods may be configured for slave nodes having different sampling frequencies or service requirements. This is applicable to flexible control and management of data transmission on each slave node in a transmission system having a plurality of service requirements, and improves data transmission efficiency.

For a technical effect that can be achieved by any possible design in the second aspect, refer to the technical effect that can be achieved by the first aspect. Details are not described herein again.

According to a third aspect, this disclosure provides an apparatus. The apparatus has functions of implementing any possible design of the first aspect or the second aspect. For example, the apparatus includes corresponding modules, units, or means of performing the steps in any possible design of the first aspect or the second aspect. The functions, units, or means may be implemented by software, or may be implemented by hardware, or may be implemented by hardware by executing corresponding software.

In a possible design, the apparatus includes a processing unit and a communications unit. The communications unit may be configured to send and receive a signal, to implement communication between the apparatus and another apparatus. The processing unit may be configured to perform some internal operations of the apparatus. Functions performed by the processing unit and the communications unit may correspond to steps in any possible design of the first aspect or the second aspect.

In a possible design, the apparatus includes a processor, and may further include a transceiver. The transceiver is configured to send and receive a signal, and the processor executes program instructions, to complete the method according to any possible design or implementation of the first aspect or the second aspect. The apparatus may further include one or more memories or may be coupled to one or more memories. The one or more memories may be integrated with the processor, or may be separate from the processor. This is not limited in this disclosure. The memory may store a computer program or instructions to implement the functions in the first aspect or the second aspect. The processor may execute the computer program or the instructions stored in the memory. When the computer program is or the instructions are executed, the apparatus is enabled to implement the method according to any possible design or implementation of the first aspect or the second aspect.

In a possible design, the apparatus includes a processor and a memory. The memory may store a necessary computer program or necessary instructions to implement the functions in the first aspect or the second aspect. The processor may execute the computer program or the instructions stored in the memory. When the computer program is or the instructions are executed, the apparatus is enabled to implement the method according to any possible design or implementation of the first aspect or the second aspect.

In a possible design, the apparatus includes at least one processor and an interface circuit. The at least one processor is configured to: communicate with another apparatus by using the interface circuit; and perform the method according to any possible design or implementation of the first aspect or the second aspect.

According to a fourth aspect, an embodiment of this disclosure further provides a communications system. The communications system includes a control node and a first slave node. The control node may be configured to perform the method according to any possible design of the first aspect, and the first slave node may be configured to perform the method according to any possible design of the second aspect.

According to a fifth aspect, an embodiment of this disclosure further provides a computer storage medium. The storage medium stores a software program. When the software program is read and executed by one or more processors, the method according to any possible design of the first aspect or the second aspect can be implemented.

According to a seventh aspect, an embodiment of this disclosure further provides a computer program. When the computer program is run on a computer, the computer is enabled to perform the method according to any possible design of the first aspect or the second aspect.

According to an eighth aspect, an embodiment of this disclosure further provides a chip. The chip is configured to read a computer program stored in a memory, to perform the method according to any possible design of the first aspect or the second aspect According to a ninth aspect, an embodiment of this disclosure provides a chip system. The chip system includes a processor, configured to support a control apparatus in implementing the functions in the foregoing aspects. In a possible design, the chip system further includes a memory. The memory is configured to store necessary program instruction and necessary data of a management device. The chip system may include a chip, or may include a chip and another discrete device.

These aspects or other aspects of this disclosure are clearer and more comprehensible in descriptions of the following embodiments.

DESCRIPTION OF EMBODIMENTS

To make the objectives, technical solutions, and advantages of this disclosure clearer, the following further describes this disclosure in detail with reference to the accompanying drawings. A specific operation method in method embodiments may also be applied to a device embodiment or a system embodiment. In the descriptions of this application, unless otherwise specified, "a plurality of" means two or more than two.

Figure 1:
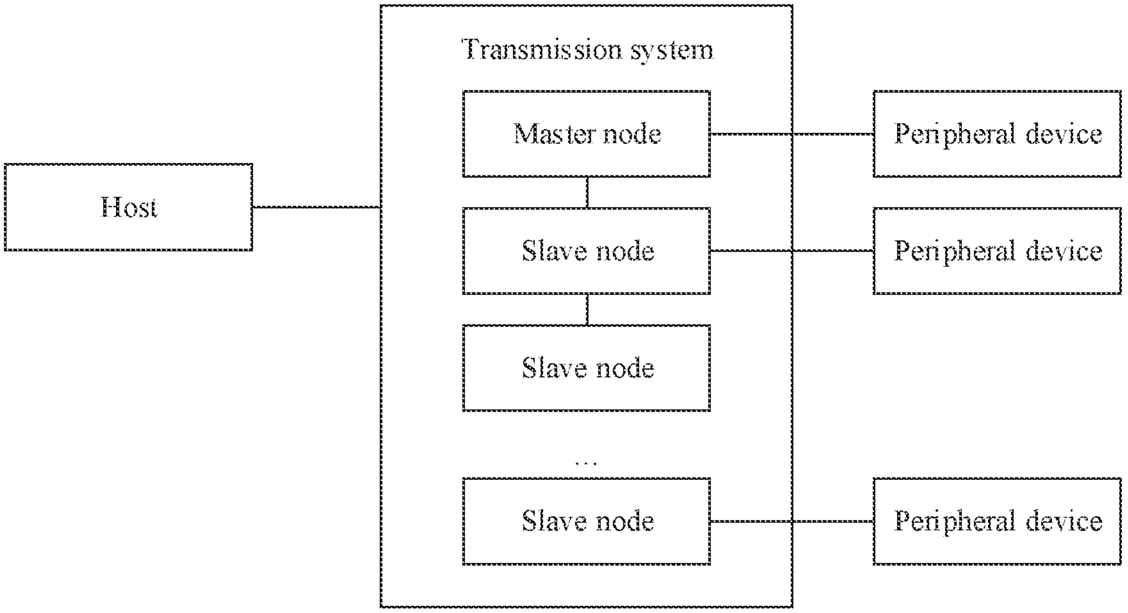
FIG. 1 is a schematic diagram of a possible system architecture to which an embodiment of this disclosure is applicable.

FIG. 1 is a diagram of a system architecture to which an embodiment of this disclosure is applicable. As shown in FIG. 1, the system architecture includes a host (a control node) and a transmission system connected to the control node. The transmission system may include one or more transmission nodes. The one or more transmission nodes include a master node (Master), and another transmission node other than the master node may be referred to as a slave node (Slave). For example, the transmission node may also be referred to as a transmission device, the master node may also be referred to as a master device, and the slave node may be referred to as a slave device. Optionally, the transmission device may be further connected to one or more peripheral devices, and the peripheral device may also be referred to as a peripheral component, an external component, an external device, or a peripheral. It can be understood that the diagram of the system architecture may be an architecture of an in-vehicle communications system, or may be a system architecture used in another scenario. This is not limited in the embodiments of this disclosure. The following describes the foregoing devices to help a person skilled in the art have a better understanding.

Host (control node): The host may be configured to configure a communications manner of each transmission node in the transmission system. For example, the control node may configure, for a transmission device in the transmission system, configuration information used to indicate operations such as receiving, demodulation, forwarding, and padding, so as to indicate the transmission device to complete some or all of the foregoing operations. The control node may further implement communication interaction between a plurality of transmission devices. In addition, the control node may further implement other functions, which are not enumerated herein one by one. For example, the control node may include a processor. The processor may be a general-purpose central processing unit (CPU), a microprocessor, an application-specific integrated circuit (ASIC), or one or more integrated circuits configured to control program execution of the solutions of this disclosure.

Master node: The master node may also be referred to as a master transmission node. The master node may receive data sent by the control node, encapsulate the data sent by the control node, and then transmit the encapsulated data to each slave node. The master node may further receive data sent by each slave node, decapsulate the data sent by each slave node, and then send the decapsulated data to the control node. If the master node is connected to a peripheral device, the master node may further transmit data to the peripheral device, for example, may obtain data collected by the peripheral device and send data to the peripheral device. The master node may further encapsulate the data collected by the peripheral device connected to the master node and then send the encapsulated data to the control node, and may decapsulate the data sent by the control node and then send the decapsulated data to the connected peripheral device. In addition, the master node may further implement other functions, which are not enumerated herein one by one. In the embodiments of this application, relative to the host (the control node), the master node may also be referred to as a subordinate node.

Slave node: The slave node may also be referred to as a slave transmission node. The slave node may obtain data collected by a peripheral device and send the data to the master node, and may further send, to the connected peripheral device, data sent by the master node or another slave node. If the slave node is an intermediate node in a daisy chain, the slave node may further forward, to the master node, data sent by a lower-level slave node, or forward, to the lower-level slave node, data sent by the master node. In addition, the slave node may further implement other functions, which are not enumerated herein one by one. In the embodiments of this application, relative to the host (the control node), the slave node may also be referred to as a subordinate node.

Peripheral device: The peripheral device may include at least one of a microphone, a millimeter wave radar, a laser radar, an ultrasonic radar, a camera, a positioning system, an inertial sensor, a speed sensor, an acceleration sensor, a humidity sensor, and a light intensity sensor. The peripheral device may further include a playback device such as a display, an external power amplifier, or a speaker. In another possible embodiment, the peripheral device may further include other possible devices, which are not enumerated herein one by one.

It should be noted that: (1) Network elements such as the control node (the host) and the subordinate nodes (the master node and the slave node) in the embodiments of this disclosure may be logical concepts or entity concepts. For example, a form of a network element such as the control node, the master node, or the slave node may be a physical device. Further, a plurality of network elements may be a plurality of physical devices, or a plurality of network elements may be integrated into one physical device. For example, a slave node 1 and a slave node 2 may be on one circuit board. For another example, a form of a network element such as the control node (the host) or the subordinate node (the master node or the slave node) may alternatively be a function implemented by a circuit board, or may be implemented by a chip or a chip area on a circuit board. (2) The system architecture described in FIG. 1 is applicable to a plurality of possible scenarios, for example, applicable to an in-vehicle audio system. When the foregoing system architecture is applied to the in-vehicle audio system, the control node may be a host (Host), for example, a digital signal processor (DSP) device, and the peripheral device may include a microphone array (MIC array), a speaker (SPK), and the like.

Figure 2:
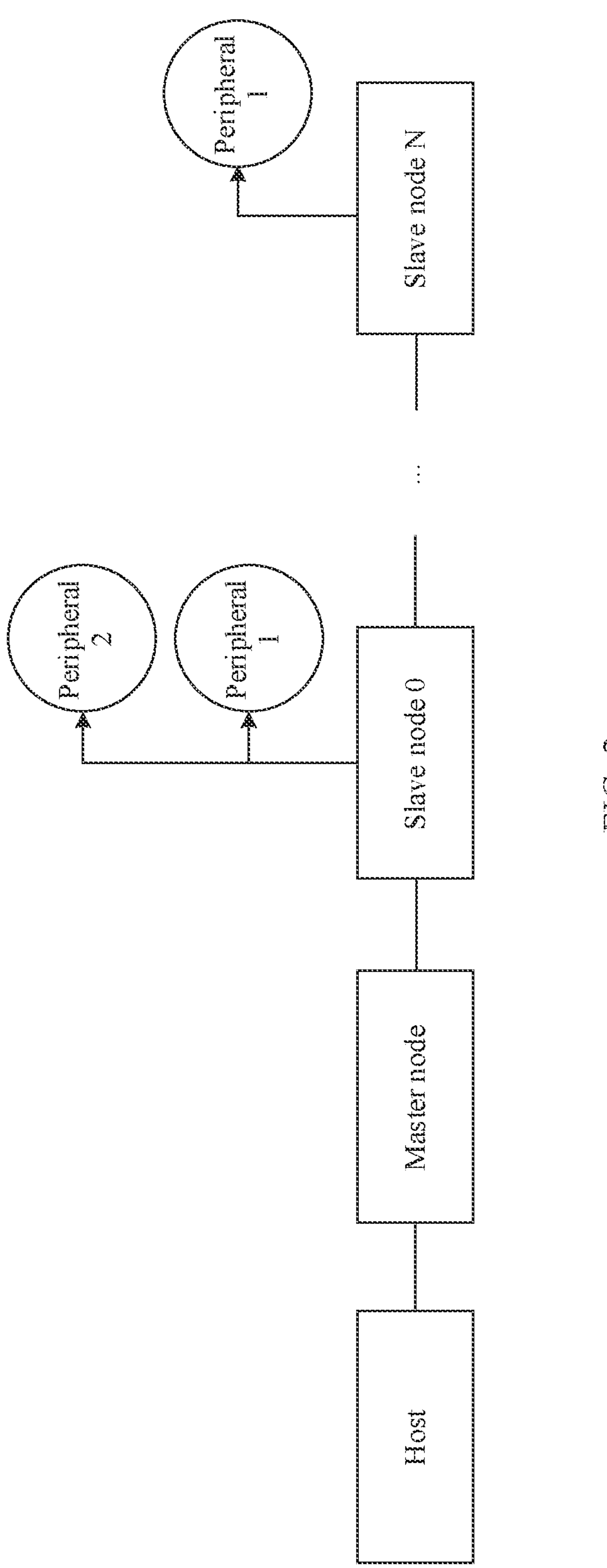
FIG. 2 is a schematic diagram of a daisy chain topology structure according to an embodiment.
Figure 3:
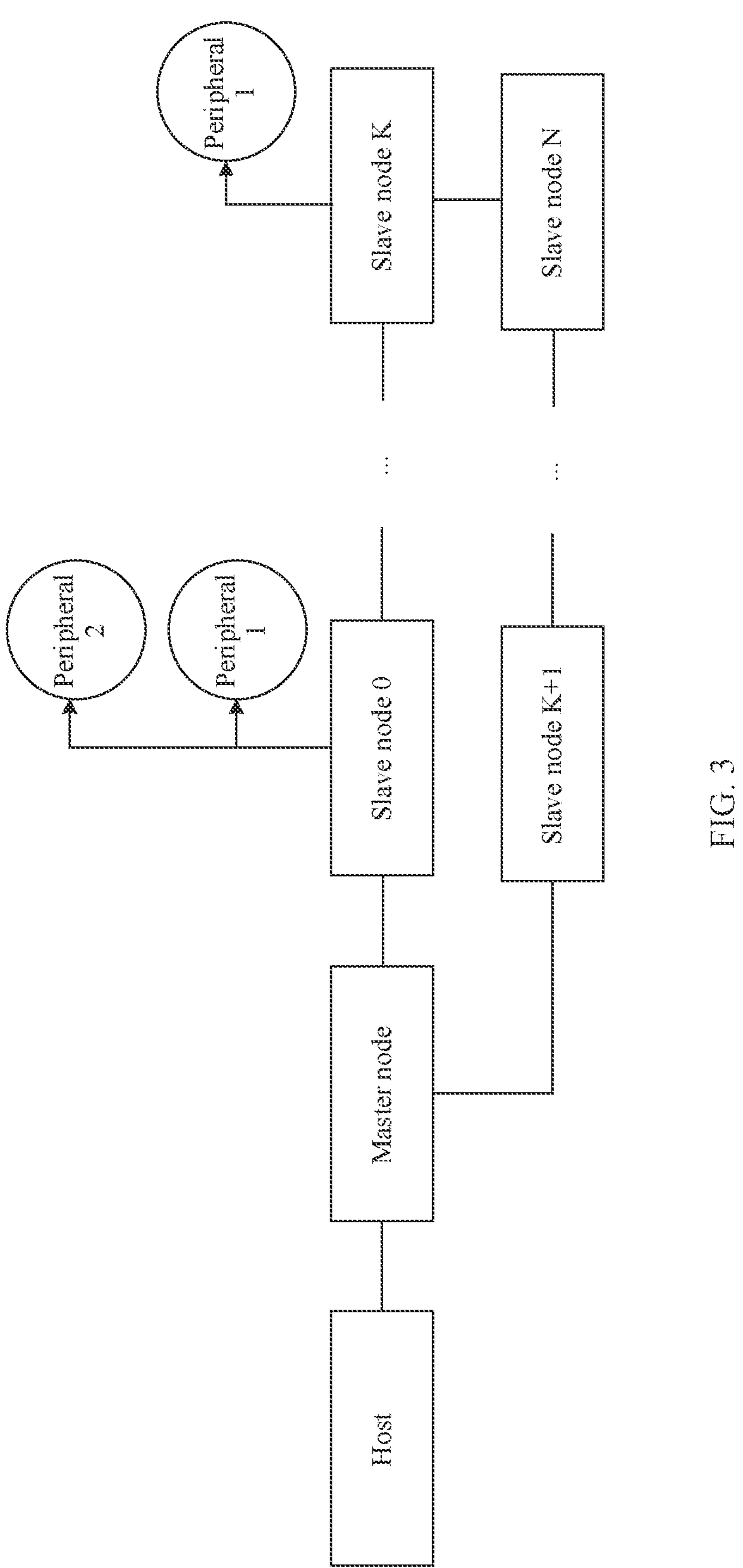
FIG. 3 is a schematic diagram of a circular topology structure according to an embodiment.

Based on the system architecture shown in FIG. 1, the system architecture includes N slave nodes, and N is an integer greater than or equal to 1. The N slave nodes may be a slave node 0, a slave node 1, a slave node 2, . . . , and a slave node N−1, where 0, 1, 2, . . . , and N−1 may be understood as numbers allocated to the slave nodes. In the embodiments of this application, a number may alternatively be allocated to the master node. For example, the number allocated to the master node is N. It should be noted that there may be a plurality of possible implementations of the number of the master node and the number of the slave node. For example, if a start number allocated to the slave node is 1, the number allocated to the master node may be 0. For example, when the transmission system includes a relatively large quantity of nodes, connections between the plurality of nodes may constitute a plurality of possible topology structures, for example, a daisy chain topology structure shown in FIG. 2, a circular topology structure shown in FIG. 3, or a tree topology structure.

Figure 4:
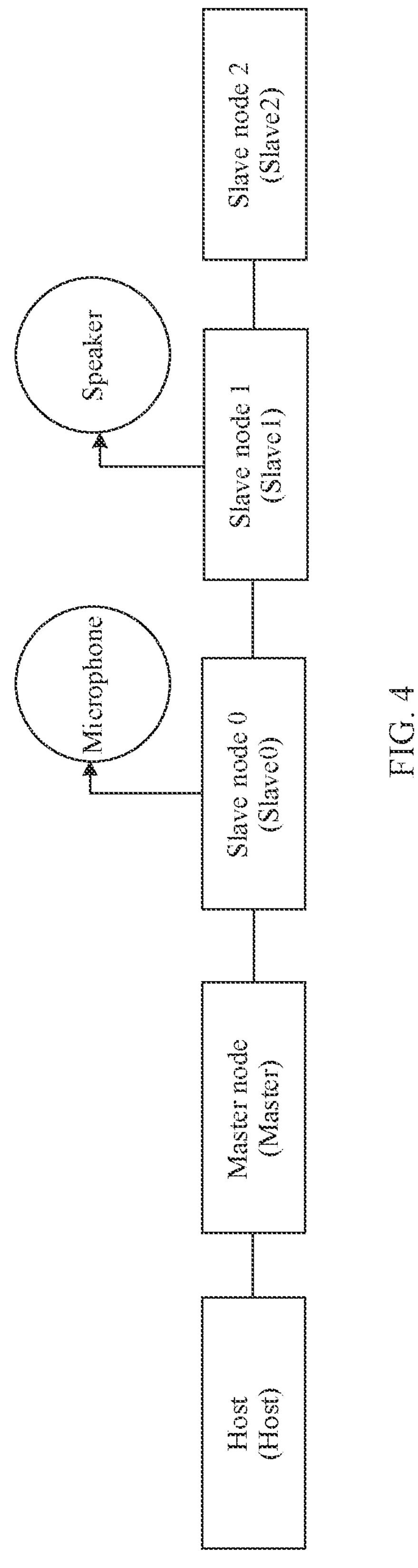
FIG. 4 is a schematic diagram of another possible system architecture embodiment.

Refer to FIG. 4. An example in which N=4 is used to describe a possible system architecture to which an embodiment of this disclosure is applicable. The system architecture is applicable to an in-vehicle audio system. Refer to FIG. 4. By using a daisy chain topology structure, a host is connected to a master node, the master node is connected to a slave node, and slave nodes are connected to each other. A slave node 0 may be understood as an upper-level node of a slave node 1, and correspondingly the slave node 1 may be understood as a lower-level node of the slave node 0; the slave node 1 may be understood as an upper-level node of a slave node 2, and correspondingly the slave node 2 may be understood as a lower-level node of the slave node 1; and so on.

For example, at least one microphone is externally connected to the slave node 0, and at least one speaker is externally connected to each of the slave node 1 and the slave node 2. The foregoing system architecture is used as an example. The slave node 0 may obtain data collected by a microphone, and send the obtained audio data to the master node. The master node decapsulates the data and then sends the decapsulated data to the host. The host may be configured to process data transmitted by a peripheral device such as the microphone, for example, may perform filtering and noise reduction on the voice data collected by the microphone. The master node may be configured to encapsulate the data processed by the host, and then send the encapsulated data to each slave device. For example, the master node encapsulates the voice data obtained through noise reduction by the host, and then sends the encapsulated voice data to the master node; the master node forwards the voice data to the slave node 0; then the slave node 0 forwards the voice data to the slave node 1; and the slave node 1 sends the audio data to a speaker for play. In other words, a downlink data stream such as audio may be sent by the host to the master node, then the master node sends the downlink data stream to each slave node, and the slave node transmits the downlink data stream to the peripheral device. A transmission path may be described as follows: Host→Master→Slave0→Slave1→Slave2. An uplink data stream such as audio is collected by the microphone and transmitted to the slave node, then the slave node sends the uplink data stream to the master node, and the master node forwards the uplink data stream to the host. A transmission path may be described as follows: Slave2→Slave1→Slave0→Master→Host. Because services are different, peripheral devices usually have different sampling frequencies, and transmission nodes need to frequently monitor service data that may be generated. This causes a relatively large energy loss. Currently, how to configure a communications solution that is adapted to a multi-service hybrid transmission requirement is a problem that needs to be resolved.

In view of this, an embodiment of this disclosure provides a communications method, to implement a data transmission method adapted to a service requirement of an electronic device. The following uses a system architecture shown in FIG. 4 as an example to describe in detail the technical solutions of this disclosure.

In this embodiment of this application, unless otherwise specified, a control node is the host in FIG. 1 (the two may be interchanged when the solution is described), and a subordinate node may be the master node or the slave node in FIG. 1.

In this application, the control node and a first subordinate node may be respectively the host and the transmission node (the master node or the slave node) shown in FIG. 1 to FIG. 4, or may be network elements that have functions of the host and the transmission node in a future communications system.

It should be noted that a second subordinate node in this embodiment of this disclosure is an upper-level node of the first subordinate node, in other words, the second subordinate node may include one or more transmission nodes. For example, when the first subordinate node is a slave node 1, the second subordinate node may be a slave node 0, or may be the master node and the slave node 0. In addition, a third subordinate node is a lower-level node of the first subordinate node, in other words, the third subordinate node may include one or more slave nodes. For example, when the first subordinate node is the slave node 0, the third subordinate node may be the slave node 1, or may be the slave node 1 and the slave node 2 in FIG. 4.

In the communications method provided in this embodiment of this application, the host may configure first configuration information for the transmission node, where the first configuration information belongs to a configuration information set, the configuration information set includes at least one piece of configuration information, and each piece of first configuration information included in the configuration information set is used to indicate whether the transmission node performs, in some or all of time units in a preset time period, an operation corresponding to the first configuration information; and the host sends any first configuration information in the configuration information set to the transmission node. Correspondingly, the transmission node receives the first configuration information from the host, and determines, based on the first configuration information, whether the operation corresponding to the first configuration information needs to be performed in some or all of the time units in the preset time period. Further, the configuration information set may include a plurality of pieces of first configuration information (different pieces of first configuration information correspond to different operations). In this case, the transmission node may jointly determine, with reference to the plurality of pieces of first configuration information, whether a plurality of operations corresponding to the plurality of pieces of first configuration information need to be performed on all the time units in the preset time period. According to the method, the host may configure corresponding first configuration information for transmission nodes having different sampling frequencies, where the first configuration information constitutes a configuration information set; and each transmission node determines, based on a configuration information set configured by the host for the transmission node, whether a corresponding operation needs to be performed. This completes a predictable or an unpredictable data transmission requirement, adapts to the service requirement of the electronic device, meets coordination and management of data transmission of each electronic device by a transmission system having a plurality of service requirements, and implements flexible configuration of each transmission node in the transmission system by the host.

First, the preset time period is described.

In this embodiment of this application, one preset time period may include a downlink time domain resource and/or an uplink time domain resource, and some or all of time domain resources may be divided based on a time unit. For example, the time unit includes but is not limited to a radio frame, a subframe, a slot, a mini-slot, a symbol, a second, a millimeter, a microsecond, and the like. This is not limited in this disclosure. For example, a quantity of time units included in the preset time period may be preset, or may be specified in a protocol, or may be determined in another manner. This is not limited in this embodiment of this disclosure.

In a possible implementation, the preset time period includes a downlink time domain resource and an uplink time domain resource, and locations of the downlink time domain resource and the uplink time domain resource in the preset time period are not limited. For example, the downlink time domain resource may be before the uplink time domain resource, or the uplink time domain resource may be before the downlink time domain resource. This is not limited in this embodiment of this disclosure. Preferably, in this embodiment of this application, the downlink time domain resource is before the uplink time domain resource in the preset time period. In addition, a quantity of time units included in the downlink time domain resource may be the same as or different from a quantity of time units included in the uplink time domain resource. For example, a time unit is a slot, the downlink time domain resource may include eight slots, and the uplink time domain resource may include six slots. This is not limited in this embodiment of this disclosure.

Figure 5:
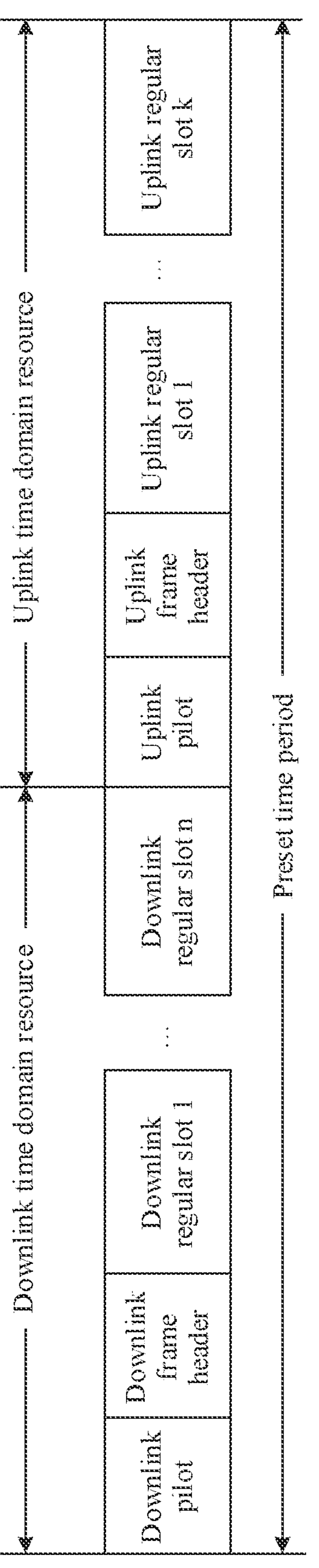
FIG. 5 is a schematic diagram of a structure of a preset time period according to an embodiment.

An example in which a preset time period includes a downlink time domain resource and an uplink time domain resource and a time unit is a slot is used below to describe the preset time period in detail. FIG. 5 is a schematic diagram of a structure of a preset time period according to an embodiment of this disclosure. As shown in FIG. 5, the preset time period includes a downlink time domain resource and an uplink time domain resource according to an arrangement order. The downlink time domain resource may include but is not limited to a time domain resource that carries a downlink pilot, a time domain resource that carries a downlink frame header, and a downlink slot 1 to a downlink slot n. The downlink time domain may be used to carry regular data of each transmission node in FIG. 4. Therefore, the downlink slot may also be referred to as a downlink regular slot. Similarly, the uplink time domain resource may include but is not limited to a time domain resource that carries an uplink pilot, a time domain resource that carries an uplink frame header, and an uplink regular slot 1 to an uplink regular slot k, where n and k may be equal or different.

For example, the downlink time domain resource is used to carry downlink information, and the uplink time domain resource is used to carry uplink information.

For example, in the system architecture shown in FIG. 4, in a preset time period, a downlink information transmission process is as follows: Host→Master→Slave0→Slave1→Slave2. Specifically, each node sequentially sends a pilot signal, a frame header, and data carried in the downlink regular slots 1 to n to a lower-level node of the node. An uplink information transmission procedure may be as follows: Slave2→Slave1→Slave0→Master→Host. Specifically, each node sequentially sends a pilot signal, a frame header, and data carried in the uplink regular slots 1 to k to an upper-level node of the node.

The following describes in detail a part included in the preset time period shown in FIG. 5.

(1) Pilot: The pilot signal may be used to perform time synchronization between two adjacent nodes, to be specific, time synchronization between a host and a master node, between a master node and a slave node, and between slave nodes.

It should be understood that a time between two adjacent nodes in the system architecture in this embodiment of this disclosure is synchronized. For example, a master node sends data a to a slave node 0 in a slot 1 in a preset time period. Correspondingly, the slave node 0 also receives the data a in the slot 1 in the preset time period. In this case, a time between two adjacent nodes is synchronized. If a time between two adjacent nodes is not synchronized, a packet loss may occur.

For example, the pilot signal may be a preset character string, for example, 10011100. Two nodes maintain consistent beats, that is, time synchronization, by using a pilot signal.

(2) Frame header: The frame header includes but is not limited to a frame number or other information.

The frame number may be an identifier of the preset time period. For example, the preset time period is a periodic cyclic period. It is assumed that frame numbers in the preset time period start from 0 to 1023 cyclically. Frame numbers in a downlink frame header and an uplink frame header in a same preset time period may be the same, and a transmission node may determine an identifier of a current time period based on a frame number.

For example, the pilot and the frame header each may be a character string of a fixed length. For example, the pilot signal is a 10-bit character string, and the frame header is a 100-bit character string. The transmission node may determine a location of the frame header based on a preset character string of the pilot signal, and determine a start time of a downlink regular slot based on preset data size of the frame header.

(3) Regular slot: The regular slot is used to carry regular data, for example, an audio signal periodically collected by a peripheral device.

For example, the slave node 0 is externally connected to a microphone, the microphone periodically collects audio data at a fixed frequency, and the slave node 0 may send the audio data to the host. In this case, the host may configure one or more uplink regular slots in the preset time period for the slave node 0, to indicate the slave node 0 to transmit the audio data by using the one or more uplink regular slots. It should be understood that a destination end of the audio data is the host. After being sent by the slave node 0, the audio data needs to be sent to the host through the master node (the foregoing example is referred to as Example 1).

Alternatively, the slave node 1 is connected to a speaker, the slave node 0 may further send the audio data to the slave node 1, and the speaker of the slave node 1 externally plays the audio data. In this case, the host may configure one or more downlink regular slots in the preset time period for the slave node 0, to indicate the slave node 0 to send the audio data to the slave node 1 and indicate the slave node 1 to receive the audio data carried in the one or more downlink regular slots (the foregoing example is referred to as Example 2).

The communications manners in Example 1 and Example 2 may be configured by using first configuration information. The following describes the first configuration information in detail.

In this embodiment of this application, the first configuration information may be used to configure some or all of time units in a preset time period. The host indicates, by using the first configuration information, a transmission node whether to perform, on any one of some or all of the time units, an operation corresponding to the first configuration information. It can be understood that different pieces of first configuration information correspond to different operations. In other words, the first configuration information may indicate two aspects: (1) a time unit and (2) an operation performed in the time unit.

For example, the first configuration information may be configured at a granularity of a time unit in the preset time period. For example, the first configuration information is a bitmap, and each bit in the bitmap is used to indicate a time unit. A correspondence between the bitmap and some or all of the time units in the preset time period may be preset or specified in a protocol, or may be determined in another manner. For example, the bitmap and some or all of the time units in the preset time period are in a left-to-right one-to-one correspondence.

To be specific, the first bit from the left in the bitmap is used to indicate the first time unit from the left in some or all of the time units in the preset time period, the second bit from the left in the bitmap is used to indicate the second time unit from the left in some or all of the time units in the preset time period, and so on.

For example, if a preset time period includes a downlink regular slot 1 to a downlink regular slot 8, and correspondingly a bitmap corresponding to first configuration information used to indicate a downlink regular slot also includes eight bits, the first bit from the left in the bits corresponds to the downlink regular slot 1, the second bit from the left corresponds to the downlink regular slot 2, the third bit from the left corresponds to the downlink regular slot 3, and so on.

It should be noted that the foregoing description is merely an example. There may be another correspondence between a bit in a bitmap and a time unit, and examples are not provided herein. For ease of description, bits in a bitmap and time units in a preset time period are in a left-to-right one-to-one correspondence below. Details are not described herein again.

For example, a value of a bit in the bitmap may be used to indicate whether to perform, in a time unit corresponding to the bit, the operation corresponding to the first configuration information. For example, if a value of a bit is 1, it indicates that the operation corresponding to the first configuration information needs to be performed. If a value of a bit is 0, it indicates that the operation corresponding to the first configuration information does not need to be performed. It should be noted that the foregoing description is merely an example. Alternatively, that a value of a bit is 0 indicates that the operation corresponding to the first configuration information needs to be performed, and that a value of a bit is 1 indicates that the operation corresponding to the first configuration information does not need to be performed. This is not limited in this embodiment of this disclosure.

The following describes in detail operations corresponding to different pieces of first configuration information. In this embodiment, the first configuration information includes but is not limited to the following configuration information: downlink time unit activation information, downlink time unit demodulation information, downlink time unit forwarding information, downlink time unit padding information, uplink time unit activation information, uplink time unit demodulation information, uplink time unit forwarding information, and uplink time unit padding information.

(1) Downlink time unit activation information: An operation corresponding to the configuration information is an activation operation, and is used to indicate whether a downlink time unit in a preset time period needs to be activated. Herein, "activate" may mean "receive", to be specific, a transmission node receives data carried in a time unit that needs to be activated. In a scenario, "activate" may alternatively mean "be used". For example, the transmission node may determine, based on an activated time unit, a time unit that can be used to pad data. Similar descriptions are not repeated in the following sections.

For a time unit that does not need to be activated, the transmission node does not need to receive data carried in the time unit. In this case, the transmission node does not need to continuously monitor each time unit, thereby reducing energy consumption.

(2) Downlink time unit demodulation information: An operation corresponding to the configuration information is a demodulation operation, and is used to indicate whether a demodulation (or decoding) operation needs to be performed on a downlink time unit in a preset time period. If yes, a transmission node demodulates data carried in the time unit on which the demodulation operation needs to be performed.

It can be understood that, before demodulating the data carried in the time unit, the transmission node needs to first receive the data carried in the time unit. In other words, the host may jointly indicate, by using a plurality of pieces of first configuration information used to indicate different operations, the plurality of operations performed in a same time unit. For example, the downlink time unit activation information is used to indicate the transmission node to first perform an activation (receiving) operation on the time unit, and then the downlink time unit demodulation information is used to indicate the transmission node to demodulate data received in the activated time unit.

(3) Downlink time unit forwarding information: An operation corresponding to the configuration information is a forwarding operation, and is used to indicate whether a forwarding operation needs to be performed in a downlink time unit in a preset time period. For a time unit in which a forwarding operation needs to be performed, a transmission node forwards data carried in the time unit to a lower-level node.

Similarly, before performing the forwarding operation, the transmission node needs to receive the data carried in the time unit. In other words, the host jointly indicates a data forwarding process by using the downlink time unit activation information and the downlink time unit forwarding information.

(4) Downlink time unit padding information: An operation corresponding to the information is a data padding (or addition) operation, and is used to indicate whether a padding operation can be performed on a downlink time unit in a preset time period, or indicate a downlink time unit in which a padding operation can be performed. For a time unit in which a padding operation can be performed, a transmission node may pad data of the transmission node to the time unit, and forward the padded data to a lower-level node.

As described above, the downlink time unit padding information may indicate a time unit by using a bitmap. For example, if downlink regular slots are numbered as a slot 1 to a slot 8, the downlink time unit padding information may be 11001010. Assuming that 1 indicates that padding can be performed and 0 indicates that padding cannot be performed, the foregoing configuration information indicates that the slot 1, the slot 2, the slot 5, and the slot 7 can be used for padding.

For example, a time unit that can be used for data padding may be alternatively indicated in another manner. For example, a location of a time unit that can be used for padding is preset, and a quantity of time units that can be used for padding is indicated by using downlink time unit padding information, so as to indicate a specific time unit that can be used for padding.

For example, after a preset location of a time unit that can be used for padding is a forwarding operation time unit, the downlink time unit padding information may be a character string including one or more bits. For example, a value of the character string is used to indicate a quantity of time units that can be used for data padding, and the time unit is a vacant time after the forwarding operation time unit, so as to maintain data frame continuity.

For example, if forwarding operation time units are the slot 1, the slot 2, and the slot 5 to the slot 7, vacant time units after the forwarding operation time units are the slot 3, the slot 4, and the slot 8. If the value of the character string corresponding to the downlink time unit padding information is 1, for example, if the downlink time unit padding information may be 00000001, in other words, if there is one downlink time unit that can be used for data padding, and correspondingly the one time unit used for padding is after the forwarding operation, the one time unit may be the slot 3, the slot 4, or the slot 8; if there are two time units that can be used for data padding, the downlink time unit padding information may be 00000010, and correspondingly the two time units may be the slot 3 and the slot 4, or the slot 3 and the slot 8, or the slot 4 and the slot 8; and so on. To maintain downlink information continuity and make no gap between downlink information as much as possible, preferably, the two time units may be the slot 3 and the slot 4.

For another example, the quantity of time units that can be used for padding may alternatively be indicated by using a quantity of bits having a preset bit value in the character string corresponding to the downlink time unit padding information. Similarly, the time unit may be a vacant time after a forwarding operation time unit.

For example, the quantity of bits whose bit values each are a preset value (for example, 1) in the character string indicates the quantity of time units that can be used for data padding, and a bit whose value is the preset value may be at any location in the character string. For example, when there is one time unit that can be used for padding, the downlink time unit configuration information may be 10000000, 01000000, or 00000010. When there are two time units that can be used for padding, the downlink time unit configuration information may be 11000000, 01100000, or 00000011. No enumeration is provided herein.

It should be noted that, for a padding operation, a transmission node may add data collected by the transmission node to a downlink time unit and forward the data to a lower-level node, in other words, the padding operation may also implement a forwarding operation function. The transmission node may further pad data received from an upper-level node to a time unit. For example, when the transmission node has a data processing function, the transmission node may process the data received from the upper-level node, and send processed data to a lower-level node through padding. For the data received from the upper-level node, the transmission node needs to first demodulate the received data, and then pads the demodulated data to a corresponding time unit. However, for a forwarding operation, the transmission node does not need to demodulate data received from an upper-level node. Therefore, the forwarding operation is more applicable to transmission of data that has a relatively high delay requirement.

The uplink time unit activation information, the uplink time unit demodulation information, the uplink time unit forwarding information, and the uplink time unit padding information are used to indicate an uplink time unit. For operations corresponding to the configuration information, refer to the specific descriptions of the downlink time unit activation information, the downlink time unit demodulation information, the downlink time unit forwarding information, and the downlink time unit padding information. Details are not described herein again.

In this embodiment, the host may configure one or more pieces of first configuration information for the transmission node. The one or more pieces of first configuration information constitute a configuration information set. It should be noted that, in the configuration information set, bits at a same location in each of a plurality of pieces of first configuration information used to configure a same part of time units in a preset time period correspond to a same time unit in a same preset time period.

Table 1 is a specific example of a configuration information set configured by the host for one transmission node. In this example, it is assumed that there are eight downlink regular slots and eight uplink regular slots, and it is assumed that the downlink regular slots are numbered as a slot 1 to a slot 8 and the uplink regular slots are numbered as a slot 9 to a slot 16. The first configuration information is a bitmap including eight bits. In addition, when a value of each bit is 1, it indicates that an operation corresponding to the first configuration information needs to be performed; or when a value of a bit is 0, it indicates that an operation corresponding to the first configuration information does not need to be performed.

TABLE 1

| Configuration information type | Bitmap | Definition |
|---|---|---|
| Downlink time unit activation information | 11111110 | Activate the slot 1 to the slot 7 in the preset time period, in other words, receive downlink data carried in the slot 1 to the slot 7 |
| Downlink time unit demodulation information | 11111100 | Demodulate the downlink data received from the slot 1 to the slot 6 |
| Downlink time unit forwarding information | 11001110 | Forward the downlink data carried in the slot 1, the slot 2, and the slot 5 to the slot 7 |
| Downlink time unit padding information | 00100000 | Pad data of the transmission node to the slot 3, and send the data to a lower-level node |
| Uplink time unit activation information | 11111110 | Activate the slot 9 to the slot 15 in the preset time period, in other words, receive uplink data carried in the slot 9 to the slot 15 |
| Uplink time unit demodulation information | 11111000 | Demodulate the uplink data received from the slot 9 to the slot 13 |
| Uplink time unit forwarding information | 10110110 | Forward the uplink data carried in the slot 9, the slot 11, the slot 12, the slot 14, and the slot 15 |
| Uplink time unit padding information | 00000000 | No uplink data adding service |

Table 1 and each piece of configuration information used to indicate a downlink time unit are used as an example below to describe a process in which the transmission node performs downlink data transmission based on the first configuration information.

For example, the first bit (from the left) in each of the downlink time unit activation information, the downlink time unit demodulation information, the downlink time unit forwarding information, and the downlink time unit padding information corresponds to the slot 1. A value of the first bit in the downlink time unit activation information is 1, indicating to receive the downlink data carried in the slot 1; a value of the first bit in the downlink time unit demodulation information is 1, indicating to demodulate the downlink data carried in the slot 1; a value of the first bit in the downlink time unit forwarding information is 1, indicating to forward the downlink data carried in the slot 1; and a value of the first bit in the downlink time unit padding information is 0, indicating not to perform a padding operation on the slot 1.

In conclusion, operations that need to be performed by the transmission node in the slot 1 include a receiving operation, a demodulation operation, and a forwarding operation. For example, a data transmission process in the slot 1 may be as follows: The transmission node receives the data carried in the slot 1, forwards the data carried in the slot 1 to a lower-level node, and demodulates the data carried in the slot 1.

For an operation that needs to be performed in the slot 2, refer to the specific descriptions of the slot 1. Details are not described herein again.

A process of determining an operation that needs to be performed in the slot 3 includes: The third bit (from the left) in each of the downlink time unit activation information, the downlink time unit demodulation information, the downlink time unit forwarding information, and the downlink time unit padding information corresponds to the slot 3. A value of the third bit in the downlink time unit activation information is 1, indicating to receive the downlink data carried in the slot 3; a value of the third bit in the downlink time unit demodulation information is 1, indicating to demodulate the downlink data carried in the slot 3; a value of the third bit in the downlink time unit forwarding information is 0, indicating not to forward the downlink data carried in the slot 3; and a value of the third bit in the downlink time unit padding information is 1, indicating to perform a padding operation on the slot 2.

In conclusion, operations performed by the transmission node in the slot 3 include a receiving operation and a demodulation operation. For example, a data transmission process in the slot 3 may be: The transmission node receives the data carried in the slot 3, and demodulates the data carried for the slot 3. The transmission node may further pad data of the transmission node to the slot 3 and send the data to a lower-level node.

For an operation that needs to be performed in another slot in the preset time period, refer to the specific descriptions of the slot 1 or the slot 3. Details are not described herein again.

In the embodiments, the host may configure the first configuration information for each transmission node in the foregoing manner, to indicate an operation performed by the transmission node in a time unit in the preset time period to complete data transmission.

Based on the foregoing content, the following describes the communications methods provided in the embodiments of this disclosure with reference to Embodiment 1 to Embodiment 3. In Embodiment 1 to Embodiment 3, the communications methods provided in this disclosure are described by using an example in which there are one host (control node) and one transmission node (subordinate node) and the host configures one piece of first configuration information for the transmission node.

Embodiment 1

Figure 6:
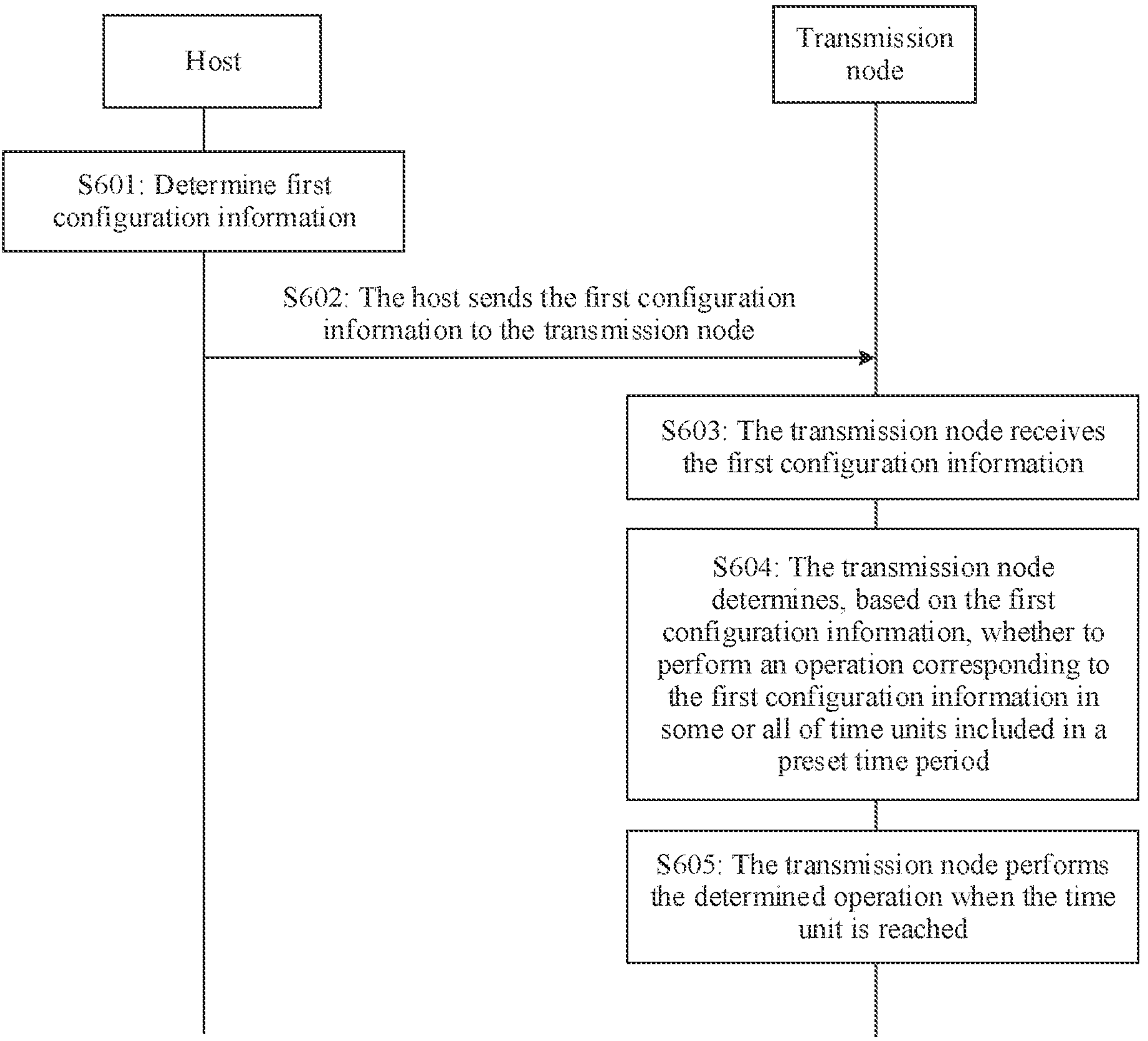
FIG. 6 is a schematic diagram of a procedure corresponding to a communications method according to an embodiment.

FIG. 6 is a schematic diagram of a procedure corresponding to a communications method according to an embodiment of this disclosure. As shown in FIG. 6, the procedure includes the following steps.

Step S601: A host determines first configuration information.

For example, the first configuration information belongs to a configuration information set, the configuration information set includes at least one piece of configuration information, and the first configuration information is used to indicate whether a transmission node performs, in some or all of time units included in a preset time period, an operation corresponding to the first configuration information.

For example, the host may configure the first configuration information for each transmission node based on a service transmission requirement of the transmission node, for example, based on that a peripheral device of the transmission node is an audio device that performs periodic sampling and whether data collected by the audio device needs to be processed or needs to be externally played. Specifically, for one example, the host may scan a peripheral device connected to each transmission node, and determine one or more data transmission requirements of each transmission node based on a device type of the transmission node or the peripheral device connected to the transmission node, and a corresponding data transmission requirement. For example, the data transmission requirement of each transmission node or the first configuration information may be preset in the host.

Step S602: The host sends the first configuration information to the transmission node.

For example, when the configuration information set includes one piece of first configuration information, the host sends the first configuration information to the transmission node. For another example, when the configuration information set includes a plurality of pieces of first configuration information, the host sends each piece of first configuration information included in the configuration information set to the transmission node.

Step S603: The transmission node receives the first configuration information.

For example, in the system architecture shown in FIG. 4, the host may be connected to the master node by using an inter-integrated circuit ($I^2C$) bus, where $I^2C$ may also be written as I2C. The master node may be connected to a slave node, and different slave nodes may be connected to each other level by level. The master node and the slave node may be connected and the slave nodes may be connected by using a twisted pair (TP) or in another manner, for example, by using a coaxial wire. This is not specifically limited. For example, the transmission device may be further connected to one or more peripheral devices by using one or more I2C buses.

Therefore, the host and each transmission node may be I2C devices, different I2C devices have different addresses, and the I2C device may include a plurality of registers. In this embodiment, different pieces of first configuration information may be configured by using a plurality of registers, for example, registers each having 7 address bits. The plurality of pieces of first configuration information corresponding to different operations each may correspond to one register address, for example, 0000001 to 0000110, first configuration information of each type corresponds to one address, and the addresses of the pieces of first configuration information are not repeated. For example, an address of a register used to configure uplink time unit activation information is 0000001, an address of a register used to configure uplink time unit demodulation information is 0000010, an address of a register used to configure uplink time unit forwarding information is 0000011, an address of a register used to configure uplink time unit padding information is 0000100, and so on.

For example, the host configures the first configuration information for each transmission node by using an I2C device address, a register address, and a character string corresponding to each register address. For another example, the host may further control the transmission node to perform a read operation and/or a write operation, and write the character string corresponding to the first configuration information into a register corresponding to each register address corresponding to the first configuration information. For another example, the host may alternatively configure the first configuration information by presetting the first configuration information in each transmission node, in other words, by writing a corresponding character string into a corresponding register of each transmission node. This is not limited in this embodiment of this disclosure.

In this embodiment, a regular time unit may be further configured based on an amount of data that needs to be periodically transmitted in a transmission system, and a quantity of time units in the preset time period is not limited.

It should be noted that 8-bit register address may correspond to eight time units. If a quantity of regular time units included in a downlink time domain resource or an uplink time domain resource in the preset time period is less than 8, some bits in the register such as five downlink regular time units may correspond to five consecutive bits from the left in the 8-bit register or may correspond to five consecutive bits from the right in the 8-bit register. This is not limited in this embodiment of this disclosure.

If a quantity of regular time units included in a downlink time domain resource or an uplink time domain resource in the preset time period is greater than 8, a plurality of 8-bit registers may be combined to configure same first configuration information. For example, if a downlink regular time unit includes 16 slots, two 8-bit registers may be used to jointly configure configuration information used to indicate a downlink time unit. For example, eight bits of one register are the most eight significant bits of the first configuration information, and eight bits of the other register are the least eight significant bits of the first configuration information. Alternatively, one 16-bit register may be used for configuration. This is not limited in this embodiment of this disclosure. To be specific, in this embodiment, registers having different quantities of bits may be combined to configure the first configuration information.

For ease of description, an example in which a downlink regular time unit and an uplink regular time unit each are eight slots is used below to describe a correspondence between the first configuration information and some or all of the time units.

In a first optional implementation, the first configuration information may be used to configure all of the time units in the preset time period. For example, if the preset time period includes only a downlink time domain resource (or includes only an uplink time domain resource), the first configuration information may include eight bits, and each bit corresponds to one downlink regular time unit (or one uplink regular time unit) in the preset time period. For another example, if the preset time period includes a downlink time domain resource and an uplink time domain resource, the first configuration information may include 16 bits, and each bit corresponds to one downlink regular time unit or one uplink regular time unit in the preset time period.

In a second optional implementation, the first configuration information may be used to configure some of the time units in the preset time period. For example, if the preset time period includes a downlink time domain resource and an uplink time domain resource, the first configuration information may include eight bits. If the first configuration information is used to indicate a downlink time domain resource, each of the eight bits corresponds to one downlink regular time unit; or if the first configuration information is used to indicate an uplink time domain resource, each of the eight bits corresponds to one uplink regular time unit.

Step S604: The transmission node determines, based on the first configuration information, an operation to be performed in some or all of the time units included in the preset time period.

Step S605: The transmission node performs the determined operation when the time unit is reached.

A procedure of performing data transmission based on the first configuration information is described below with reference to a specific example.

Example 1: Configure Broadcast Data Transmission by Using the First Configuration Information The system architecture shown in FIG. 4 and the downlink regular time unit are used as an example. It is assumed that the downlink regular time unit is a slot 1 to a slot 8, and a time unit used to carry broadcast data may be the slot 1 and the slot 2. In this case, the broadcast data transmission may be configured as follows:

Step 11: The host configures, for the master node, first configuration information used to perform broadcast data transmission.

The first configuration information configured by the host for the master node includes but is not limited to downlink time unit activation information and downlink time unit padding information. For example, the downlink time unit activation information may be 11XXXXXX (X indicates no limitation, may be 0 or 1, and may be configured based on a data transmission requirement; and this is not limited), and the downlink time unit padding information (bitmap) may be 11XXXXXX. Correspondingly, the slave node determines, based on each piece of first configuration information, that the slot 1 and the slot 2 are activated slots, and pads, to the slot 1 and the slot 2, broadcast data that needs to be transmitted.

The foregoing description is merely an example. The downlink time unit padding information may alternatively be a character string used to indicate a quantity of time units that can be used for padding, for example, 00000010. If the downlink time unit padding information is a character string, the master node may determine an activated time unit based on the downlink time unit activation information, and pad, to an activated time unit whose time (location) is earlier, downlink data that needs to be transmitted. For ease of description, the following example of performing configuration in a manner in which the downlink time unit padding information is a bitmap is used for description.

It should be noted that data padded by the master node may be data sequentially received by the host. This manner is applicable to the following example. Details are not described again.

Step 12: The host configures, for the slave node 0, first configuration information used to perform broadcast data transmission.

For example, the first configuration information configured by the host for the slave node 0 includes but is not limited to downlink time unit activation information, downlink time unit demodulation information, and downlink time unit forwarding information. The downlink time unit activation information may be 11XXXXXX (X indicates no limitation, and may be 0 or 1), the downlink time unit demodulation information may be 11XXXXXX, and the downlink time unit forwarding information may be 11XXXXXX. Correspondingly, the slave node determines, based on each piece of first configuration information, to perform a receiving operation, a demodulation operation, and a forwarding operation on the slot 1 and the slot 2. It can be understood that the slot 1 and the slot 2 are data padded by the master node.

Step 13: The host configures, for the slave node 1, first configuration information used to perform broadcast data transmission.

The first configuration information configured by the host for the slave node 1 may be the same as the first configuration information configured by the host for the slave node 0. For details, refer to the detailed descriptions of step 12. Details are not described herein again.

Step 14: The host configures, for the slave node 2, first configuration information used to perform broadcast data transmission.

The first configuration information configured by the host for the slave node 2 includes but is not limited to downlink time unit activation information, downlink time unit demodulation information, and downlink time unit forwarding information. The downlink time unit activation information may be 11XXXXXX (X indicates no limitation, and may be 0 or 1), the downlink time unit demodulation information may be 11XXXXXX, and the downlink time unit forwarding information may be 00XXXXXX. Because the slave node 2 is a tail-end subordinate node and has no lower-level node, the slave node 2 does not need to perform a forwarding operation on the slot 1 and the slot 2, but only needs to perform a receiving operation and a demodulation operation.

The host sends the first configuration information configured for each transmission node to each transmission node, and each transmission node determines, based on each piece of first configuration information in the configuration information set, an operation that needs to be performed on the slot 1 to the slot 8. If the host or the master has to-be-transmitted broadcast data, the broadcast data may be carried by using the slot 1 and the slot 2, and a process of transmitting the broadcast data is as follows: The host sends the broadcast data to the master node by using the slot 1 and the slot 2. The master node determines to perform a receiving operation, a demodulation operation, and a forwarding operation on the slot 1 and the slot 2, in other words, the master node forwards the received data of the slot 1 and the slot 2 to a lower-level node, namely, the slave node 0. The slave node 0 forwards the received data of the slot 1 and the slot 2 to a lower-level node, namely, the slave node 1. The slave node 1 forwards the received data of the slot 1 and the slot 2 to a lower-level node, namely, the slave node 2. Each node demodulates the received data of the slot 1 and the slot 2. Therefore, each transmission node in the transmission system can receive the data, to implement a data broadcasting function.

It should be noted that: (1) The steps described in the foregoing example are merely examples, and there is no strict sequence of performing step 11 to step 14. (2) In the foregoing and the following examples, the first configuration information configured by the host for each transmission node is merely an example used to indicate that the data transmission manner corresponding to the example can be completed, and is not a limitation on the configuration information configured by the host for each transmission node. For example, In Example 1, the host may further configure downlink time unit padding information or the following second configuration information for the slave node. This is not limited in this embodiment of this disclosure. For example, the host may configure all configuration information for the transmission node, and the configuration information may indicate not to perform an operation corresponding to the configuration information. Alternatively, the host may configure some configuration information for the transmission node, and for configuration information that is not configured, each transmission node is preset not to perform an operation corresponding to the configuration information. For example, if a value of a bit is 0, it indicates not to perform the operation corresponding to the configuration information. Step 12 is used as an example. The host may configure downlink time unit padding information for the slave node 0, and the downlink time unit padding information (bitmap) may be 00XXXXXX. Alternatively, the host does not configure downlink time unit padding information for the slave node 0. In this case, for configuration information that is not configured by the host, the transmission node considers by default that a bit value of each bit corresponding to the configuration information is 0 (for example, 00000000), in other words, the transmission node does not perform an operation corresponding to the configuration information. Alternatively, for configuration information that is not configured, each transmission node considers by default that the configuration information is a preset value, and the preset value may be an initial value. For example, the initial value of the configuration information is 0.

Example 2: Perform Data Multicast by Using the First Configuration Information

The system structure shown in FIG. 4 is used as an example. Assuming that the slave node 1 and the slave node 2 constitute a group, transmission of multicast data of the node group may be configured as follows:

Step 21: The host configures, for the master node, first configuration information used to perform multicast data transmission.

For example, the first configuration information configured by the host for the master node includes but is not limited to downlink time unit activation information and downlink time unit padding information. The downlink time unit activation information may be 11XXXXXX (X indicates no limitation, and may be 0 or 1), and the downlink time unit padding information may be 11XXXXXX. Correspondingly, the master node determines, based on each piece of first configuration information, that the slot 1 and the slot 2 are activated slots, and pads, to the slot 1 and the slot 2, multicast data that needs to be transmitted. It should be understood that the master node does not learn whether data that needs to be padded is broadcast data or multicast data. As described above, the master node may sequentially pad, based on the first configuration information, data sequentially received from the host to a determined time unit that can be used for padding.

Step 22: The host configures, for the slave node 0, first configuration information used to perform multicast data transmission.

For example, the first configuration information configured by the host for the slave node 0 includes but is not limited to downlink time unit activation information and downlink time unit forwarding information. The downlink time unit activation information may be 11XXXXXX (X indicates no limitation, and may be 0 or 1), and the downlink time unit forwarding information may be 11XXXXXX. Correspondingly, the master node determines, based on each piece of first configuration information, to perform a receiving operation and a forwarding operation on the slot 1 and the slot 2.

Step 23: The host configures, for the slave node 1, first configuration information used to perform multicast data transmission.

The first configuration information configured by the host for the slave node 1 includes but is not limited to downlink time unit activation information, downlink time unit demodulation information, and downlink time unit forwarding information. The downlink time unit activation information may be 11XXXXXX (X indicates no limitation, and may be 0 or 1), the downlink time unit demodulation information may be 11XXXXXX, and the downlink time unit forwarding information may be 11XXXXXX. Correspondingly, the slave node 1 determines, based on each piece of first configuration information, to perform a receiving operation, a demodulation operation, and a forwarding operation on the slot 1 and the slot 2.

Step 24: The host configures, for the slave node 2, first configuration information used to perform multicast data transmission.

The first configuration information configured by the host for the slave node 2 includes but is not limited to downlink time unit activation information, downlink time unit demodulation information, and downlink time unit forwarding information. The downlink time unit activation information may be 11XXXXXX (X indicates no limitation, and may be 0 or 1), the downlink time unit demodulation information may be 11XXXXXX, and the downlink time unit forwarding information may be 00XXXXXX. Correspondingly, the slave node 2 determines, based on each piece of first configuration information, to perform a receiving operation and a demodulation operation on the slot 1 and the slot 2.

According to the foregoing manner, multicast data can be transmitted between the slave node 1 and the slave node 2.

Example 3: Perform Data Unicast by Using the First Configuration Information The system architecture shown in FIG. 4 is used as an example. Assuming that the host sends unicast data to the slave node 0, transmission of the unicast data may be configured as follows:

Step 31: The host configures, for the master node, first configuration information used by the master node to send unicast data to the slave node 0.

The first configuration information configured by the host for the master node includes but is not limited to downlink time unit activation information and downlink time unit padding information. The downlink time unit activation information may be 11XXXXXX (X indicates no limitation, and may be 0 or 1), and the downlink time unit padding information may be 11XXXXXX. Correspondingly, the master node determines, based on each piece of first configuration information, that the slot 1 and the slot 2 are activated slots, and pads, to the slot 1 and the slot 2, broadcast data that needs to be transmitted.

Step 32: The host configures, for the slave node 0, first configuration information used by the host to send unicast data to the slave node 0.

The first configuration information configured by the host for the slave node 0 includes but is not limited to downlink time unit activation information and downlink time unit demodulation information. The downlink time unit activation information may be 11XXXXXX, and the downlink time unit demodulation information may be 11XXXXXX. Correspondingly, the slave node 0 determines, based on each piece of first configuration information, to perform a receiving operation and a demodulation operation on the slot 1 and the slot 2.

According to the foregoing manner, unicast data can be transmitted between the master node and the slave node 0.

Example 4: Transmit Data Between Two Transmission Nodes by Using an Indication of the First Configuration Information For ease of description, it is assumed that the two transmission nodes are the slave node 0 and the slave node 2 in FIG. 4, the slave node 0 sends downlink data to the slave node 2, and the slave node 2 receives the downlink data sent by the slave node 0.

The following provides a procedure corresponding to a data transmission method in an embodiment of this disclosure. The procedure includes the following steps.

Step 41: The host determines first configuration information of each transmission node based on a data transmission requirement of the transmission node.

In an application scenario, the slave node 0 is connected to the microphone, the microphone periodically collects audio data, the slave node 2 is connected to the speaker, and the audio data collected by the slave node 0 needs to be played by the slave node 2. In other words, the slave node 0 and the slave node 2 have data transmission requirements. In this case, the host may configure a data transmission time unit and a corresponding operation for the slave node 0 and the slave node 2, to complete data transmission between the slave node 0 and the slave node 2.

The audio data periodically collected by the slave node 0 is regular data. It is assumed that downlink regular slots include a slot 1 to a slot 8, the audio data collected by the slave node 0 needs to occupy two slots, and vacant downlink regular slots are the slot 3 and the slot 4.

For example, to complete data transmission between the slave node 0 and the slave node 2, a configuration information set configured by the host for the slave node 0 includes but is not limited to downlink slot activation information that may be 00110000 and downlink slot padding information that may be 00110000; a configuration information set configured by the host for slave1 includes but is not limited to downlink slot activation information that may be 00110000 and downlink slot forwarding information that may be 00110000; and a configuration information set configured by the host for the slave 2 includes but is not limited to downlink slot activation information that may be 00110000 and downlink slot demodulation information that may be 00110000.

Step 42: The host configures a configuration information set for each transmission node, and correspondingly the transmission node determines, based on the first configuration information in the configuration information set, an operation corresponding to a time unit in a preset time period.

Step 43: The host sends a pilot and a frame header to the master node, the master node sends the pilot and the frame header to the slave node 0, the slave node 0 sends the pilot and the frame header to the slave node 1, and the slave node 1 sends the pilot and the frame header to the slave node 2.

Step 44: The slave node 0 pads the collected audio data to the slot 3 and the slot 4, and sends the data carried in the slot 3 and the data carried in the slot 4 to the slave node 1.

Step 45: The slave node 1 receives and forwards the data carried in the slot 3 and the slot 4 to the slave node 2.

Step 46: The slave node 2 receives and demodulates the data carried in the slot 3 and the slot 4.

According to the foregoing manner, data can be transmitted between two nodes, and a case in which a node forwards data to a host and then the host forwards the data is not required. This shortens a transmission delay, and reduces resource overheads of data forwarding.

The foregoing describes a time unit that can be used to carry regular data and a configuration manner of the time unit. An embodiment of this disclosure further provides a structure of another preset time period, to provide transmission and feedback of burst random data.

Figure 7:
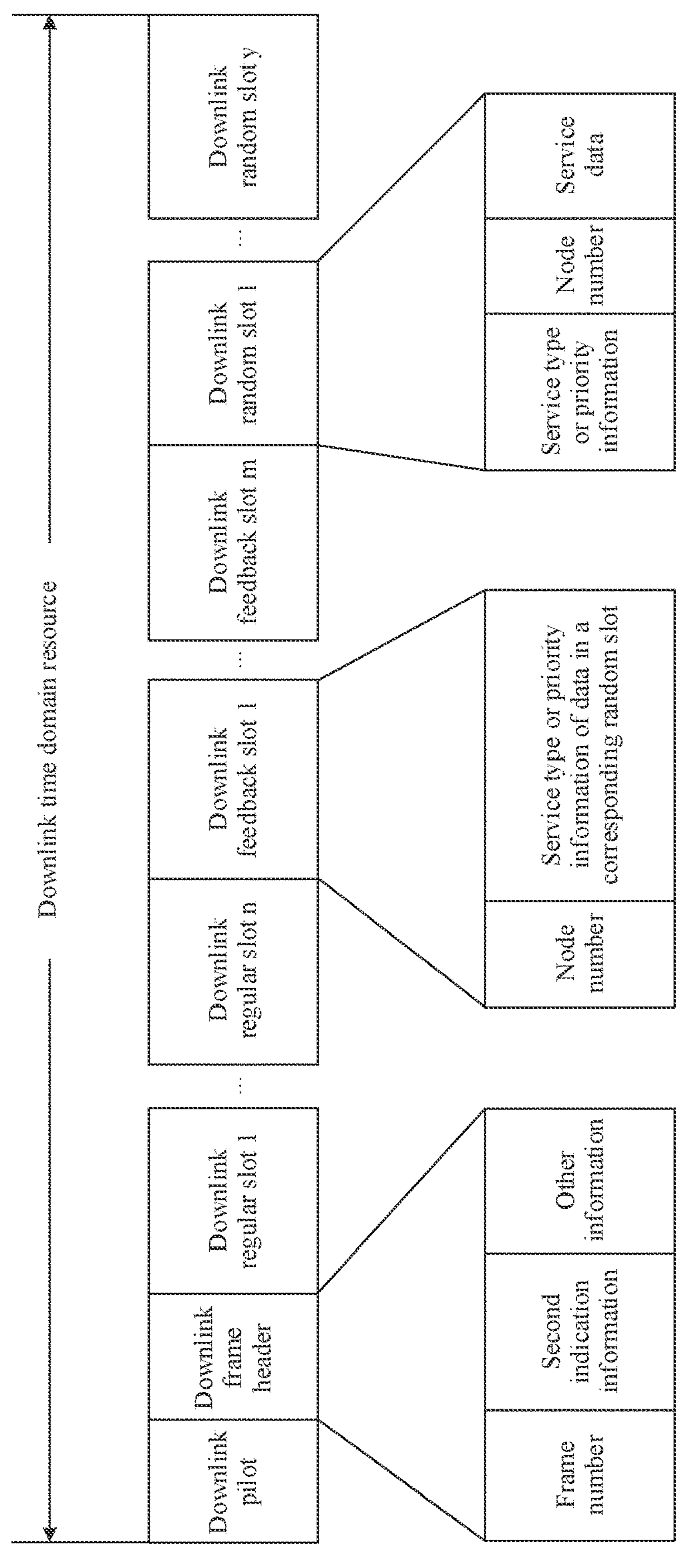
FIG. 7 is a schematic diagram of a structure of another downlink time domain resource in a preset time period according to an embodiment.
Figure 8:
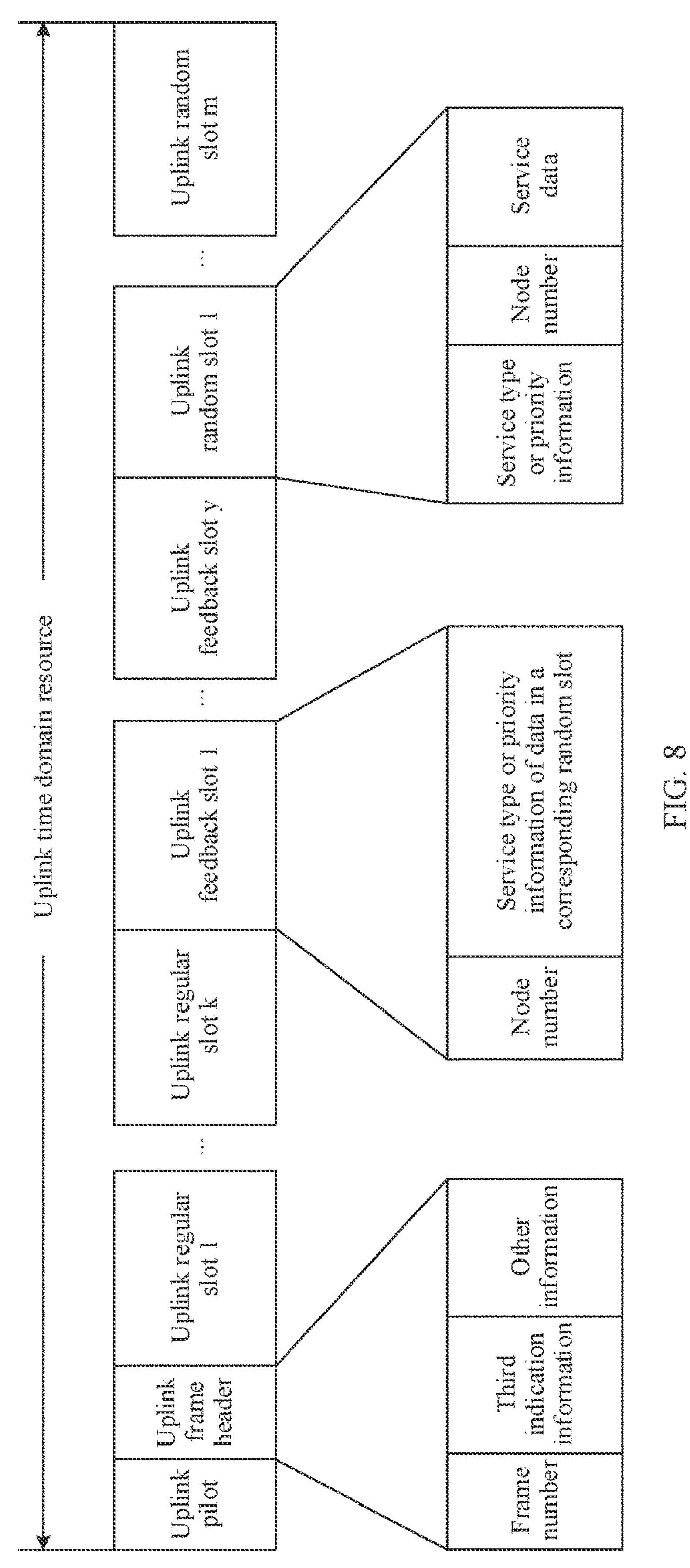
FIG. 8 is a schematic diagram of a structure of another uplink time domain resource in a preset time period according to an embodiment.

FIG. 7 is a schematic diagram of a structure of another downlink time domain resource in a preset time period according to an embodiment of this disclosure. Correspondingly, a structure of an uplink time domain resource in the preset time period may be the same as a structure of an uplink time domain resource shown in FIG. 7. FIG. 8 is a schematic diagram of a structure of an uplink time domain resource.

For example, FIG. 7 and FIG. 8 show a same preset time period. The following uses a downlink time domain resource as an example to describe a structure of the downlink time domain resource. FIG. 7 and FIG. 8 are similar, except that directions are different. Details are not described again. The following describes only a difference between the structure shown in FIG. 7 and the structure shown in FIG. 5.

(1) Random Time Unit

For example, a time unit in FIG. 7 is a slot. A downlink random slot is used to carry burst downlink random data, a node number of a node of the downlink random data, and related information of the downlink random data, for example, service type or priority information of the downlink random slot.

The random data herein means that a data transmission requirement is not fixed, and is generally burst data, unpredictable data, or low-frequency data. For example, the unpredictable data includes data detected by a sensor, for example, abnormal data detected by a temperature sensor, a humidity sensor, or a vibration sensor. For another example, the low-frequency data is data whose sampling frequency is less than a preset frequency, for example, data whose sampling frequency is less than 1 Hz.

For example, a receive end of the downlink random data may be one or more preset transmission nodes, and the transmission node may have a data processing capability. For example, the transmission node may perform a data processing function of the host. Similarly, a receive end of uplink random data may also be one or more preset nodes, for example, the host.

(2) Feedback Time Unit

For example, a time unit in FIG. 7 is a slot. A downlink feedback slot is used to carry feedback information, and the feedback information is used to indicate that random data carried in a corresponding random slot is successfully received or not successfully received.

For example, downlink random slots 1 to y are in a one-to-one correspondence with uplink feedback slots 1 to y in a preset time period in which the downlink random slots are located. For example, the downlink random slots 1 to y in FIG. 7 are in a one-to-one correspondence with uplink feedback slots 1 to y in FIG. 8. In other words, uplink feedback slots 1 to y in a preset time period are respectively used to carry uplink feedback information corresponding to downlink random data carried in downlink random slots 1 to y in the same preset time period, and the uplink feedback information is used to indicate that uplink random data carried in at least one fourth time unit is successfully received or not successfully received.

For example, the uplink feedback slot 1 is used to carry the feedback information for the downlink random slot 1. For example, the feedback information includes a node number carried in the downlink random slot 1 and carried service type or priority information of the random data.

The uplink random slots 1 to m in FIG. 8 are in a one-to-one correspondence with downlink feedback slots 1 to m in a next preset time period. In other words, downlink feedback slots 1 to m in a current preset time period in two adjacent preset time periods are respectively used to carry downlink feedback information of uplink random data carried in uplink random slots 1 to m in a previous preset time period, and the downlink feedback information is used to indicate that the uplink random data carried in the uplink random slots 1 to m is successfully received or not successfully received.

In a first optional implementation, the feedback information includes but is not limited to a node number included in a downlink random slot i that is received by slave2 in the downlink random slot i and a service type of random data 1.

For example, the service type may be a type of a signal collected by a sensor, for example, a temperature signal, a vibration signal, or a pressure signal lamp. This is not limited in this embodiment of this disclosure.

In a second optional implementation, the feedback information includes but is not limited to the node number included in the downlink random slot i that is received by slave2 in the downlink random slot i and priority information of the random data 1.

A priority is used to represent an importance degree of a signal of the service type. Priorities corresponding to different service types may be entirely different or may not be entirely the same. In other words, service types may be in a one-to-one correspondence with priorities, or a plurality of service types may correspond to a same priority. For example, if the service type includes a temperature, vibration, and pressure, a priority of the temperature signal may be 1, a priority of the vibration signal is 2, and a priority of the pressure signal is 3; or priorities of both the temperature signal and the pressure signal are 1, and a priority of the vibration signal is 2.

It should be noted that a type of information carried in an uplink feedback slot is the same as a type of information carried in a corresponding downlink random slot. For example, if the downlink random slot carries service type information of random data, the corresponding uplink feedback slot should also include the service type information of the random data; or if the downlink random slot carries priority information of random data, the uplink feedback slot should also include the priority information of the random data.

In a third optional implementation, in addition to the foregoing information, the feedback information may further include receiving result information. For example, a receiving result may be "successfully received" or "not successfully received", where "successfully received" means that the data is received and correctly demodulated, and "not successfully received" means that the data is not received or is not correctly demodulated. For example, "successfully received" is an ACK (acknowledge character, acknowledgement), and "not successfully received" is a NACK.

Correspondingly, in the foregoing first and second optional implementations, it is assumed that the node number in the downlink random slot i is slave0, in other words, the random data in the downlink random slot i is sent by slave0. Correspondingly, slave0 receives feedback information of a corresponding uplink feedback slot i. If the feedback information includes the node number of slave0 and service type or priority information, it is determined that a receiving result of slave2 is "successfully received", in other words, the random data does not need to be retransmitted; otherwise, it is determined that slave2 fails to receive the random data, and slave0 needs to retransmit the random data to slave2. For example, slave0 retransmits the random data to slave2 in a downlink random slot in a next preset time period.

In the foregoing third optional implementation, if the feedback information of slave0 in the uplink feedback slot i includes the node number of slave0, the service type or priority information, and the ACK, it is determined that retransmission does not need to be performed; otherwise, it is determined that the random data needs to be retransmitted.

(3) Frame Header

A downlink frame header includes a frame number, second indication information, and other information, and the second indication information is used to indicate a quantity of remaining downlink random slots. The uplink frame header includes a frame header, third indication information, and other information, and the third indication information is used to indicate a quantity of remaining uplink random slots.

For example, a transmission node having a random data transmission requirement may determine, based on a size of random data of the transmission node and a size of data that can be carried in a random slot, a quantity of random slots required by the random data. When a frame header is received, a quantity of remaining random slots in the frame header is modified based on the quantity of remaining random slots indicated in the frame header and the quantity of random slots required by the random data of the frame header, and the random data is transmitted to the remaining slots.

For example, a downlink random slot includes a downlink random slot 1 to a downlink random slot 3, the slave node 1 receives a downlink frame header from the slave node 0, and second indication information in the downlink frame header indicates that a remaining downlink random slot is 2, in other words, there are two remaining downlink random slots. The slave node 1 has downlink random data. If the downlink random data needs to occupy one downlink random slot, the slave node 1 modifies the quantity of remaining downlink random slots indicated by the second indication information to 1. If the downlink random slot of the slave node 1 needs to occupy two downlink random slots, the slave node 1 modifies the quantity of remaining downlink random slots indicated by the second indication information to 0, and sends the second indication information to a lower-level node, namely, the slave node 2.

It should be noted that: (1) In the uplink time domain resource or the downlink time domain resource provided in this embodiment, there may be one or more types of time units. For example, there may be one or more regular slots, feedback slots, or random slots in the preset time period. (2) The second indication information may alternatively be carried by using other information. This is not limited in this embodiment of this disclosure. (3) A quantity of time units of a same type in the downlink time domain resource may be the same as or may be different from a quantity of time units of a same type in the uplink time domain resource. This is not limited in this embodiment of this disclosure. For example, for the downlink regular slots 1 to n and the uplink regular slots 1 to k, n and k may be the same or may be different, and for the downlink random slots 1 to y and the uplink random slots 1 to m, y and m may be the same or may be different. This is not limited in this embodiment of this disclosure. For example, in a same preset time period, a downlink time domain resource may include eight regular slots, two feedback slots, and two random slots, and the uplink time domain resource may include four regular slots, four feedback slots, and four random slots. (4) Lengths of data carried in the regular time unit, the feedback time unit, and the random time unit may be the same or may be different. For example, data carried in each regular slot may be 32 bits, and data carried in each random slot may be 32 bits or may not be 32 bits. Preferably, it can be learned from FIG. 7 or FIG. 8 that the data carried in each random slot may be greater than 32 bits because the random slot further needs to carry information such as a node number and a service type or a priority.

In this embodiment, the random slot may be configured by using second configuration information. The second configuration information is described in detail below.

In this embodiment, the configuration information set may further include second configuration information, and the second configuration information may be used to configure information about an uplink random slot and/or information about a downlink random slot. The information may include but is not limited to location information and/or quantity information of the random slot. For ease of description below, second configuration information used to configure a downlink random slot is referred to as downlink random time unit information, and second configuration information used to configure an uplink random slot is referred to as uplink random time unit information.

The following specifically describes the second configuration information.

(1) The downlink random time unit information is used to indicate information about a downlink random time unit.

For example, the host may configure the second configuration information for a transmission node having a random data service, so as to indicate, to the transmission node, locations and/or a quantity of downlink random time units that can be used to carry random data. Correspondingly, the transmission node may use a vacant time unit in the downlink random time units to carry downlink random data of the transmission node, and send the downlink random data to a lower-level node.

For example, when the downlink random time unit information is used to indicate the locations and the quantity of downlink random time units, the downlink random time unit information may be a bitmap, and each bit is used to indicate one downlink random time unit. For example, it is assumed that the downlink time domain resource includes the slot 1 to the slot 8, and the downlink random time unit information may be 00000011, where 1 indicates that a time unit corresponding to the bit is a random time unit, and 0 indicates that a time unit corresponding to the bit is not a random time unit. In this case, 00000011 indicates that the slot 7 and the slot 8 are downlink random time units. Correspondingly, a transmission node provided with the downlink random time unit information may pad downlink random data of the transmission node to the slot 7 and/or the slot 8. Preferably, the transmission node first pads the random data to a random time unit whose location (time) ranks high.

For another example, when the downlink random time unit information is used to indicate the quantity of downlink random time units, the second configuration information may alternatively be an indication value, and the indication value may be used to indicate the quantity of random time units. For example, if the downlink random transmission time unit information is 00000010, and a value of the character string is 2, it indicates that the quantity of downlink random time units in the preset time period is 2. For another example, if the downlink random transmission time unit information is 00000011, and a value of the character string is 3, it indicates that the quantity of downlink random time units in the preset time period is 3. A location of the random time unit may be preset. For example, the downlink random time unit is located at the end of the downlink time domain resource, and the uplink random time unit is located at the end of the uplink time domain resource. For example, the downlink time domain resource includes the slot 1 to the slot 16. If the quantity of downlink random time units is 2, the downlink random time units are the slot 15 and the slot 16; or if the quantity of downlink random time units is 3, the downlink random time units are the slot 14 to the slot 16. In other words, the random time unit is always located at the end of the time domain resource.

(2) The uplink random time unit information is used to indicate information about an uplink random time unit. For details, refer to the downlink random transmission time unit information. Details are not described herein again.

It should be noted that, for a preset operation performed in a random time unit, each transmission node includes a receiving operation and a forwarding operation. When there is random data, a node provided with second configuration information may further perform a padding operation in a random slot. For a preset operation performed in a random slot, a receiving node having random data includes a receiving operation and a demodulation operation.

For a preset operation performed in a feedback time unit, each transmission node includes a receiving operation and a forwarding operation. If the transmission node sends random data by using a random time unit, the transmission node further needs to perform a receiving operation and a demodulation operation in a feedback time unit corresponding to the random time unit. For example, the preset operation may be configured by using the first configuration information, or may be specified in a protocol or predefined. For example, the uplink time unit padding information is used to indicate an uplink random slot that can be used for padding, and the uplink time unit activation information, the uplink time unit demodulation information, and the uplink time unit forwarding information are used to indicate an activation operation, a demodulation operation, or a forwarding operation performed by each transmission node on the uplink random slot. For details, refer to the foregoing descriptions of the first configuration information. Details are not described herein again.

The following describes the foregoing technical solutions in detail with reference to specific embodiments.

Figure 9:
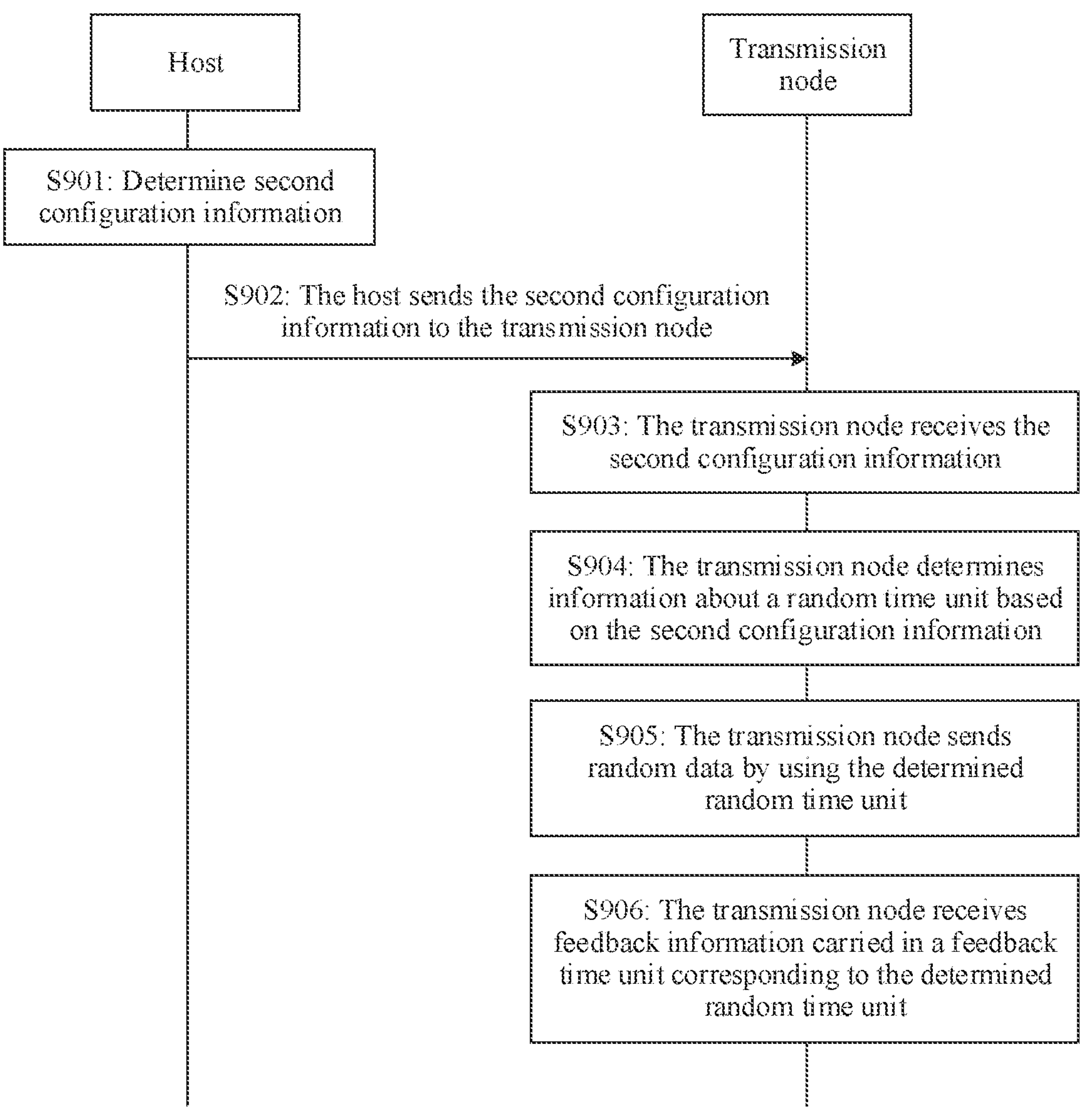
FIG. 9 is a schematic diagram of a procedure corresponding to another communications method according to an embodiment.

FIG. 9 is a schematic diagram of a procedure corresponding to another communications method according to an embodiment of this disclosure. As shown in FIG. 9, the procedure includes the following steps.

Step S901: A host determines second configuration information.

For example, the second configuration information belongs to a configuration information set. For example, the configuration information set may include one or more pieces of configuration information. Optionally, the configuration information set may further include first configuration information.

For example, the host may configure the second configuration information for a transmission node based on a service transmission requirement of the transmission node, for example, based on that service data of the transmission node is burst random data, for example, based on that a peripheral device of the transmission node is a sensor or a sampling frequency of the transmission node or a peripheral device of the transmission node is relatively low.

Step S902: The host sends the second configuration information to the transmission node.

Step S903: The transmission node receives the second configuration information.

For example, for implementations of step S902 and step S903, refer to the specific descriptions of step S602 and step S603. Details are not described herein again.

Step S904: The transmission node determines information about a random time unit based on the second configuration information.

Step S905: The transmission node sends random data by using the determined random time unit.

For example, the transmission node sends downlink random data by using a determined downlink random time unit, or the transmission node sends uplink random data by using a determined uplink random time unit.

Step S906: The transmission node receives feedback information carried in a feedback time unit corresponding to the determined random time unit.

If the feedback information indicates that the random data of the determined random time unit is not successfully received, the transmission node retransmits the random data. For example, the transmission node sends downlink random data by using a determined downlink random time unit, and receives feedback information carried in an uplink feedback time unit corresponding to the downlink random time unit in a same preset time period; and if the feedback information indicates that the downlink random data of the downlink random time unit is not successfully received, the transmission node may retransmit the downlink random data by using a downlink random time unit in a next preset time period. For another example, the transmission node sends uplink random data by using a determined uplink random time unit, and receives feedback information carried in a downlink feedback time unit corresponding to the uplink random time unit in a downlink preset time period; and if the feedback information indicates that the uplink random data of the uplink random time unit is not successfully received, the transmission node may retransmit the uplink random data by using an uplink random time unit in a next preset time period.

It should be understood that the host may coordinate a data receiving operation and a data sending operation of transmission nodes by using the first configuration information, to avoid a data conflict that may occur between the transmission nodes for a regular time unit. A random time unit is a time unit shared by one or more transmission nodes, and random data of each transmission node is unpredictable. When a plurality of transmission nodes all have random data transmission requirements, the transmission nodes may conflict in a same random time unit. For example, for downlink random time units, it is assumed that identifiers of the downlink random time units are a slot 7 and a slot 8. With reference to FIG. 4, both the slave node 0 and the slave node 1 have downlink random data. Because the slave node 0 is an upper-level node of the slave node 1, the slave node 0 pads the downlink random data of the slave node 0 to the slot 7 and the slot 8 before the slave node 1, and the slave node 1 also wants to pad the downlink random data of the slave node 1 to the slot 7 and/or the slot 8. In this case, a conflict occurs.

Optionally, some fields in the second configuration information may be further used to indicate whether to enable an overwrite function of the transmission node. For example, when one bit is used to indicate the function, the one bit is the first bit from the left in the second configuration information. For example, if a value of the first bit in the second configuration information is 1, it indicates that the overwrite function of the transmission node is enabled; or if a value of the first bit in the second configuration information is 0, it indicates that the overwrite function of the transmission node is disabled. Optionally, a value of a remaining bit in a character string corresponding to the second configuration information may be used to indicate a quantity of random time units. For example, if uplink random time unit information is 10000010, the first bit is 1, indicating that an uplink overwrite function is enabled; and values of the last seven bits are 2, indicating that a quantity of uplink random time units is 2. If downlink random time unit information is 00000011, the first bit is 0, indicating that a downlink overwrite function is disabled; and values of the last seven bits are 3, indicating that a quantity of downlink random time units is 3.

It should be noted that the foregoing description is merely an example, and the information used to indicate whether to activate the overwrite function may alternatively be other information, for example, a piece of separate configuration information. This is not limited in this embodiment of this disclosure.

The following separately describes overwrite function enabling and disabling.

(1) Overwrite function activation (overwrite function enabling) means that, when random data of the transmission node conflicts with random data of another transmission node, in other words, when the transmission node needs to send the random data by using a random time unit and the random time unit already carries the random data of the another transmission node, the transmission node can overwrite the random data of the another transmission node. For example, the transmission node further needs to determine whether the random data of the another transmission node can be overwritten, for example, performs determining based on priorities of the two pieces of random data. For example, assuming that the downlink random transmission time unit information indicates that an overwrite function of a transmission node A is enabled, when random data of the transmission node conflicts with random data of another transmission node, in other words, when a downlink random time unit already carries the random data, the transmission node A may obtain information about a priority (referred to as a first priority) of the random data carried in the downlink random time unit. It can be understood that the random data is random data of any intermediate node between the transmission node A and the host. The transmission node A compares a priority (referred to as a second priority) of the random data of the transmission node A with a priority of the random data of the intermediate node (including an upper-level node). If the second priority is higher than the first priority, the transmission node A can overwrite, by using the random data of the transmission node A, the random data carried in the intermediate node; otherwise, the transmission node A cannot overwrite the random data of the intermediate node, and the transmission node A needs to forward the random data to a lower-level node.

(2) Overwrite function deactivation (overwrite function disabling) means that, when random data of the transmission node conflicts with random data of another transmission node, the transmission node cannot overwrite the random data of the another transmission node. In other words, if the overwrite function of the transmission node is disabled, the transmission node can only use a vacant random time unit to carry the random data of the transmission node.

For ease of description, an example in which second indication information is used to indicate a first quantity of remaining downlink random slots, third indication information is used to indicate a second quantity of remaining uplink random slots, a quantity of uplink random slots required for uplink random data of the transmission node is a third quantity, and a quantity of downlink random slots required for downlink random data of the transmission node is a fourth quantity is used below to describe a procedure in which the transmission node sends the random data by using the determined random time unit. The procedure may include the following several cases:

Case 1: If the first quantity is greater than the fourth quantity, random data of the transmission nodes does not conflict.

Case 2: If the first quantity is less than the fourth quantity and the first quantity is greater than 0, a part of the downlink random data of the transmission nodes conflicts.

Case 3: If the first quantity is 0, all of the downlink random data of the transmission nodes conflicts.

The following describes the foregoing several possible cases by using specific examples.

Example 1: The Random Data of the Transmission Nodes does not Conflict

In Example 1, a procedure of sending downlink random data and receiving uplink feedback information is described with reference to the structure of the preset time period shown in FIG. 7 and FIG. 8 by using a downlink random slot as an example. The procedure may include the following steps.

Step A1: The transmission node determines a downlink random slot based on the second configuration information.

For example, a preset downlink random slot is at the end of a downlink time domain resource, a preset uplink random slot is at the end of an uplink time domain resource, and the second configuration information is used to indicate a quantity of downlink random slots. The transmission node determines the quantity of downlink random slots and the location of the preset random slot based on the second configuration information, to determine one or more downlink random slots in the preset time period, for example, to determine start locations of the one or more downlink random slots.

Step A2: The transmission node determines a quantity of downlink random slots that need to be occupied by the downlink random data of the transmission node.

A size of the downlink random data of the transmission node and a size of data that can be carried in each downlink random slot may be used to determine a quantity of random time units required for the random data of the transmission node. For example, one downlink random slot can carry 32-bit data. Assuming that the downlink random data of the transmission node is 60 bits, two downlink random slots are required to carry the downlink random data.

In a possible scenario, when receiving a downlink frame header, the transmission node has no downlink random data transmission requirement. After the downlink frame header is sent to a lower-level node, downlink random data is generated. In this case, the transmission node may transmit the downlink random data in a next preset time period.

Step A3: The transmission node determines a quantity of remaining downlink random slots based on second indication information in the downlink frame header.

For example, the transmission node may determine whether the first quantity is greater than the fourth quantity. For example, if the first quantity is not less than the fourth quantity, step A4 is performed.

Step A4: The transmission node pads the downlink random data of the transmission node to the remaining downlink random slots.

For example, if there are a plurality of downlink random slots or there are a plurality of remaining downlink random slots, a manner in which a transmission node performs padding in a downlink random slot may be preset. For example, to maintain downlink information continuity (there is no vacant slot interval), each transmission node may first perform padding in a random slot whose location (time) ranks high. For example, if identifiers of downlink random slots ranked in a time sequence are the slot 7, the slot 8, and the slot 9, the transmission node first transmits the downlink random data by using the slot 7 and then performs padding in the slot 8, and so on.

Therefore, the transmission node may determine a location of a remaining (vacant) downlink random slot based on a preset padding rule and locations of the one or more downlink random slots that are determined by the second configuration information.

For example, in FIG. 7, a start slot of a downlink random slot is the slot 7, a quantity of downlink random slots is 3, and a preset padding rule for a random slot is first performing padding in a random slot whose time ranks first. If a quantity of remaining random slots is 1, the remaining random slot is the slot 9; or if a quantity of remaining random slots is 2, the remaining random slots are the slot 8 and the slot 9.

It should be noted that, if the transmission node uses the downlink random slot and the quantity of remaining downlink random slots changes, the transmission node needs to update the second indication information in the downlink frame header, and the second indication information is used to indicate a quantity of latest remaining downlink random slots to a lower-level node.

Step A5: A preset receiving node of a downlink random slot receives data carried in the downlink random slot, and sends, by using an uplink feedback slot corresponding to the downlink random slot, feedback information of the data carried in the downlink random slot.

Step A6: The transmission node receives feedback information carried in an uplink feedback slot corresponding to the used downlink random slot.

Example 2: The Part of the Downlink Random Data of the Transmission Nodes Conflicts In Example 2, only a difference between Example 2 and Example 1 is described.

In step A3, the first quantity is less than the fourth quantity and the first quantity is greater than 0.

Step B1: The transmission node determines whether random data carried in a downlink random slot that conflicts can be overwritten.

If the second indication information indicates that the first quantity is greater than 0 and less than the fourth quantity, there is a vacant random slot, but the downlink random data of the transmission node cannot be entirely carried.

It can be understood that the downlink random slot that conflicts is a difference between the fourth quantity of downlink random slots required for the downlink random data of the transmission node and the first quantity of remaining downlink random slots. For example, if the fourth quantity is 2 and the first quantity is 1, there is one downlink random slot that conflicts, and according to the preset padding rule, padding is first performed in a downlink random slot whose location ranks high. Therefore, the one downlink random slot is the first downlink random slot. The downlink random data carried in the downlink random slot that conflicts is an upper-level node of the transmission node. For example, if the transmission node is the slave node 2 in FIG. 4, the random data carried in the downlink random slot that conflicts may be random data of the master node, the slave node 0, or the slave node 1.

The transmission node may transmit the downlink random data of the transmission node by overwriting the data in the downlink random slot that conflicts, or may select not to overwrite the data. If transmission is performed through overwriting, the process includes:

(1) Determine, based on the second configuration information, whether an overwrite function can be activated.

If the overwrite function is enabled, procedure (2) is entered.

(2) Obtain priority information of the random data carried in the downlink random slot that conflicts, and compare a priority of the downlink random data of the transmission node with a priority of the random data that conflicts.

If the priority of the downlink random data of the transmission node is relatively high, the transmission node may overwrite a part of the downlink random data of the transmission node to a downlink random slot that conflicts and whose carried random data has a relatively low priority.

If the priority of the downlink random data of the transmission node is relatively low, the transmission node cannot overwrite the random data that conflicts, and the transmission node needs to receive and forward the random data carried in the downlink random slot that conflicts.

For example, a downlink random slot 1 to a downlink random slot 3 carry random data, and a quantity of remaining downlink random slots is M. It is assumed that the quantity of downlink random slots required for the downlink random data of the transmission node is M+1. In other words, after the transmission node pads the downlink random data of the transmission node to the remaining M downlink random slots, one downlink random slot may further need to be occupied. Assuming that a preset overwrite rule is first overwriting a downlink random slot whose time ranks high, the transmission node further needs to overwrite the downlink random slot 1. For example, the transmission node obtains information about a priority (referred to as a first priority) of the random data carried in the downlink random slot 1, and compares the first priority with a priority (referred to as a second priority) of the downlink data of the transmission node. If the second priority is higher than the first priority, the transmission node overwrites the downlink random time unit 1 with the part of the downlink random data of the transmission node; otherwise, the transmission node does not overwrite the downlink random slot 1, and the transmission node receives and forwards the downlink random data carried in the downlink random slot 1.

Optionally, in the foregoing manner, the transmission node continues to determine, through comparison, whether the downlink random time unit 2 can be overwritten, then compares the downlink random time unit 3 if the downlink random time unit 2 still cannot be overwritten, and so on, until a vacant downlink random slot is received. If the transmission node pads a part of data to any one of the downlink random time unit 1 to the downlink random time unit 3, the transmission node pads the remaining downlink random data to the remaining M downlink random slots, to be specific, starting from the downlink random slot 4 to a downlink data frame.

For example, the transmission node pads a part of the downlink random data of the transmission node such as a front part of the downlink random data to a determined downlink random slot that can be overwritten, and pads a remaining part (a back part) of the downlink random data to a vacant downlink random slot. For example, there are two parts of downlink random data of the transmission node: data 1 and data 2. The data 1 is a data part that can be carried in a downlink random slot that needs to be overwritten. When the downlink random slot that needs to be overwritten is reached, the transmission node pads the data 1 to the downlink random slot, and when a vacant downlink random slot is reached, the transmission node sequentially pads the data 2 to the reached downlink random slot.

Step B2: A preset receiving node of a downlink random slot receives data carried in the downlink random slot, and sends, by using an uplink feedback slot corresponding to the downlink random slot, feedback information of the data carried in the downlink random slot.

Step B3: The transmission node receives feedback information carried in an uplink feedback slot corresponding to the used downlink random slot.

For example, in a preset time period, downlink random slots are a downlink random slot 1 to a downlink random slot M−3, and correspondingly uplink feedback slots are an uplink feedback slot 1 to an uplink feedback slot M−3. If the transmission node uses the downlink random slot 1 and the downlink random slot 4 to the downlink random slot M−3, the transmission node needs to receive the uplink feedback slot 1 and the uplink feedback slot 4 to the uplink feedback slot M−3 in the same preset time period.

If a receiving result indicated by one or more uplink feedback slots is “not successfully received”, the transmission node needs to retransmit random data carried in a corresponding downlink random slot. For example, if the uplink feedback slot 1 indicates that random data (data 1) carried in the downlink random slot 1 is not successfully received, the transmission node may repeatedly send the data 1 in a next preset time period, and does not need to retransmit successfully received random data.

For example, with reference to the system architecture shown in FIG. 4, it is assumed that the preset receiving node of the downlink random slot is the slave 2, and the slave 2 pads feedback information corresponding to each downlink random slot to a corresponding uplink feedback slot in a same preset time period based on a receiving result of random data carried in each downlink random slot.

In a first implementation, information carried in the downlink random slot includes downlink random data (service data in FIG. 7), a node number of a node sending the downlink random data, and a service type of the downlink random data. Correspondingly, feedback information carried in an uplink feedback slot corresponding to the downlink random slot may include the node number carried in the downlink random slot received by the receiving node (it should be noted that a plurality of transmission nodes may overwrite the slot and the receiving node receives a finally carried node number) and the service type of the random data carried in the downlink random slot.

Correspondingly, if the feedback information received by the transmission node includes the node number of the transmission node and the service type, the random data carried in the corresponding downlink random slot is successfully received; otherwise, the random data carried in the corresponding downlink random slot is not successfully received.

It should be noted that, if the downlink random slot carries the service type, the transmission node may determine, based on a preset correspondence between a service type and a priority, a priority of the random data carried in the downlink random slot.

In a second implementation, the service type of the random data may not be sent, and priority information is used to replace the service type, in other words, both the downlink random slot and the uplink feedback slot carry the priority information.

Correspondingly, if the feedback information received by the transmission node includes the node number of the transmission node and the priority information, the random data carried in the corresponding downlink random slot is successfully received; otherwise, the random data carried in the corresponding downlink random slot is not successfully received.

Optionally, the feedback information may further include an ACK (acknowledgement, acknowledgement)/NACK (negative acknowledgement, negative acknowledgement) to indicate whether a receiving result is “successfully received” or “not successfully received”.

For example, for random data that needs to be retransmitted, a retransmission granularity of the random data may be a part of random data carried in one downlink random time unit. For example, if the transmission node determines, based on the feedback information, that data in only one downlink random slot is not successfully received, the transmission node may retransmit only random data carried in the downlink random slot, and does not need to retransmit a part of successfully received random data of a random time unit.

It can be understood that a case in which random data of a downlink random slot is not successfully received may be caused when the random data of the downlink random slot is overwritten by a lower-level node of the transmission node, or may be caused by another reason, for example, incorrect decoding.

Therefore, a transmission node whose downlink random data is overwritten also needs to receive a corresponding uplink feedback slot. For example, random data carried in the downlink random slot 1 is overwritten with the data 1 of the transmission node, the carried random data is of the slave node 0, and the slave node 0 also needs to receive feedback information of the uplink feedback slot 1 corresponding to the downlink random slot 1.

Because the random data is unpredictable, for a preset operation performed in each random slot, a transmission node that sends downlink random data and a lower-level node of the transmission node include a receiving operation and a forwarding operation, and preferably may determine, based on second indication information of a downlink frame header, a downlink random slot that carries random data, and perform a receiving operation and a forwarding operation. For a downlink random slot that does not carry random data, a receiving operation and a forwarding operation may be terminated in advance. This reduces energy consumption. Optionally, the transmission node may further determine a vacant downlink random slot in an energy detection manner. The energy detection manner is implemented based on the conventional technology. Details are not described herein.

Example 3: All Downlink Random Data of the Transmission Nodes Conflicts

In Example 2, only a difference between Example 2 and Example 1 is described.

In step A3, the first quantity is 0. In this example, the transmission node determines, in the manner in Example 2, whether random data of another node can be overwritten, and if the random data of the another node can be overwritten, the transmission node compares a priority of the downlink random data of the transmission node with a priority of random data carried in each downlink random slot that conflicts, to determine a downlink random slot that can be overwritten. For details, refer to the descriptions in Example 2. Details are not described herein again.

It should be noted that the downlink random slot is used as an example for description. For a communications manner of an uplink random slot, refer to the specific descriptions of the downlink random slot. Details are not described herein again.

In this embodiment, the host may further configure third configuration information for the transmission node. The third configuration information may belong to a configuration information set. For example, the third configuration information is used to indicate an identifier of a preset time period. For another example, the third configuration information is used to indicate a time interval between two adjacent preset time periods. For example, the preset time period is a valid time period of the first configuration information and/or the second configuration information configured by the host for the transmission node.

For example, the host may configure a valid period of the first configuration information and/or the second configuration information based on a sampling period (or a sampling frequency) of the transmission node. For example, it is assumed that period identifiers of time periods are 1, 2, 3, . . . , and n, and after n is reached, period identifier recounting is performed. If the sampling period of the transmission node is not greater than the preset time period, the valid period (namely, the preset time period) may be all periods. If the sampling period is twice the preset time period, the valid period may be a period whose period identifier is an even number, for example, 2, 4, or 6, or may be a period whose period identifier is an odd number, for example, 1, 3, or 5.

For example, Table 2 is a specific example of the third configuration information provided in this embodiment of this disclosure.

TABLE 2

| Information type | Character string | Definition |
| --- | --- | --- |
| Third indication information | XX | 01 indicates that a valid period identifier is an odd number;<br>10 indicates that a valid period identifier is an even number; and<br>00 indicates that all periods are valid. |

It should be noted that Table 2 is merely an example. A character string length of the third configuration information and period identifiers corresponding to values of different character strings are not limited in this embodiment of this disclosure.

For another example, the third configuration information may be further used to indicate a time interval between two adjacent preset time periods. For example, the third configuration information may be an indication value, and the indication value indicates a quantity of interval periods. For example, if the quantity of interval periods is 1, the third configuration information may be 01; if the quantity of interval periods is 2, the third configuration information may be 10; or if the quantity of interval periods is 3, the third configuration information may be 11.

Within the valid period, in other words, within the preset time period, the transmission node determines a corresponding operation based on the first configuration information and/or the second configuration information configured by the host. Within the valid period, the transmission node performs an operation corresponding to the first configuration information and/or the second configuration information configured by the host. Within an invalid period, the transmission node may not perform an operation based on the first configuration information and/or the second configuration information configured by the host.

In an optional implementation, the transmission node may be in a dormant state in an invalid period, and the transmission node in a dormant state may monitor only a pilot and a frame header part in the time period, and may not perform operations corresponding to the first configuration information and the second configuration information, in other words, may not transmit regular data, random data, or feedback information.

In another optional implementation, the transmission node may transmit random data based on the second configuration information in an invalid period. For example, the valid period of the transmission node is a period whose period identifier is an odd number. If the transmission node has random data in a period whose period identifier is an even number, the transmission node may transmit the random data within the period.

Optionally, the transmission node may further transmit feedback information. For example, a period identifier of a valid period of the slave node 0 is an odd number. If the slave node 0 receives, within a period whose period identifier is 3, the uplink random data carried in the uplink random slot n, the slave node 0 may send feedback information in a next period, namely, a period whose period identifier is 4, by using the corresponding downlink feedback slot n.

The foregoing mainly describes the solutions provided in the embodiments of this disclosure from the perspective of interaction between a host and a transmission node. It can be understood that, to implement the foregoing functions, the host and the transmission node may include corresponding hardware structures and/or software modules for performing the functions. A person skilled in the art should be easily aware that, in combination with units and algorithm steps of the examples described in the embodiments disclosed in this specification, the embodiments of this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments, function unit division may be performed on the host and the transmission node based on the foregoing method examples. For example, each function unit may be obtained through division based on a corresponding function, or two or more functions may be integrated into one processing unit. The integrated unit may be implemented in a form of hardware, or may be implemented in a form of a software functional unit.

Figure 10:
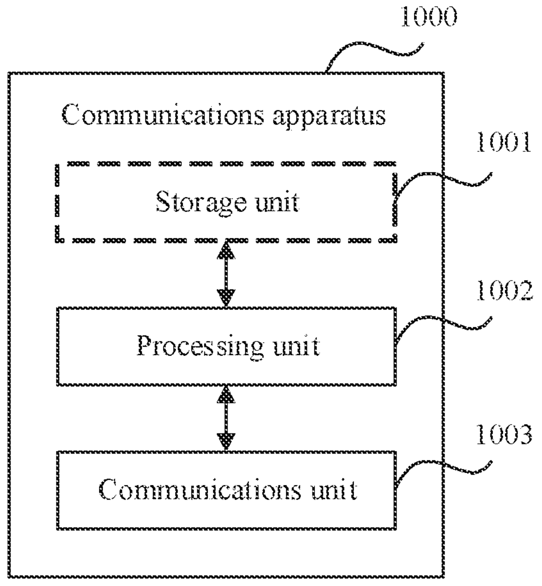
FIG. 10 is a schematic diagram of a structure of a communications apparatus according to an embodiment.

When an integrated unit is used, FIG. 10 is a block diagram of a possible example of a communications apparatus according to an embodiment of this disclosure. As shown in FIG. 10, the communications apparatus 1000 may include a processing unit 1002 and a communications unit 1003. The processing unit 1002 is configured to control and manage an action of the communications apparatus 1000. The communications unit 1003 is configured to support communication between the communications apparatus 1000 and another device. Optionally, the communications unit 1003 is also referred to as a transceiver unit, and may include a receiving unit and/or a sending unit, which are respectively configured to perform a receiving operation and a sending operation. The communications apparatus 1000 may further include a storage unit 1001, configured to store program code and/or data of the communications apparatus 1000.

The communications apparatus 1000 may be the host (or a chip disposed in the host) in any one of the foregoing embodiments. The host and the transmission node are connected in a daisy chain or a circular topology. The processing unit 1002 may support the apparatus 1000 in performing an action of the host in the foregoing method examples, or the processing unit 1002 mainly performs an internal action of the host in the foregoing method examples. The communications unit 1003 may support communication between the apparatus 1000 and the master node.

In an embodiment, the processing unit 1002 is configured to determine first configuration information, where the first configuration information belongs to a configuration information set, the configuration information set includes at least one piece of configuration information, and the first configuration information is used to indicate whether a first slave node performs, in some or all of time units included in a preset time period, an operation corresponding to the first configuration information; and the communications unit 1003 is configured to send the first configuration information to the first slave node.

In a possible design, the first configuration information is a bitmap, and bits included in the bitmap are in a one-to-one correspondence with some or all of the time units included in the preset time period. Any bit included in the bitmap is used to indicate whether to perform, on a corresponding time unit, the operation corresponding to the first configuration information.

In a possible design, the configuration information set includes one or more of the following configuration information: uplink time unit activation information, uplink time unit demodulation information, uplink time unit forwarding information, uplink time unit padding information, downlink time unit activation information, downlink time unit demodulation information, downlink time unit forwarding information, and downlink time unit padding information.

In a possible design, the preset time period includes a downlink time domain resource and/or an uplink time domain resource. The downlink time domain resource includes a time domain resource used to carry a downlink pilot, a time domain resource used to carry a downlink frame header, and at least one first time unit used to carry periodic downlink regular data; and the uplink time domain resource includes a time domain resource used to carry an uplink pilot, a time domain resource used to carry an uplink frame header, and at least one second time unit used to carry periodic uplink regular data.

In a possible design, the downlink time domain resource further includes at least one third time unit used to carry downlink feedback information and/or at least one fourth time unit used to carry burst downlink random data; and the uplink time domain resource further includes at least one fifth time unit used to carry uplink feedback information and/or at least one sixth time unit used to carry burst uplink random data.

In a possible design, the communications unit 1003 is further configured to send second configuration information to the first slave node, where the second configuration information is used to indicate information about the at least one fourth time unit; and/or the second configuration information is used to indicate information about the at least one sixth time unit. The any information includes location information and/or quantity information.

In a possible design, the second configuration information is further used to indicate whether the first slave node activates an overwrite function within the preset period. The overwrite function includes that downlink random data of a second slave node may be overwritten with downlink random data of the first slave node; and/or the overwrite function includes that uplink random data of a third slave node may be overwritten with uplink random data of the first slave node. The control node, the second slave node, the first slave node, and the third slave node are connected in series. The second slave node is an upper-level node of the first slave node, and the third slave node is a lower-level node of the first slave node.

In a possible design, the communications unit 1003 is further configured to send second indication information, where the second indication information is used to indicate a first quantity of seventh time units that do not carry downlink random data in the at least one fourth time unit.

In a possible design, the communications unit 1003 is specifically configured to send the second indication information on the time domain resource used to carry a downlink frame header.

In a possible design, the communications unit 1003 is specifically configured to receive third indication information on the time domain resource used to carry an uplink frame header, where the third indication information is used to indicate a second quantity of at least one eighth time unit that does not carry uplink random data in the at least one sixth time unit.

In a possible design, the third time unit is in a one-to-one correspondence with the sixth time unit; and at least one third time unit in a current preset time period in two adjacent preset time periods is used to carry downlink feedback information of uplink random data carried in at least one sixth time unit in a previous preset time period, where the downlink feedback information is used to indicate that the uplink random data carried in the at least one sixth time unit is successfully received or not successfully received.

In a possible design, the communications unit 1003 is further configured to send third configuration information to the first slave node, where the third configuration information is used to indicate an identifier of the preset time period, or the third configuration information is used to indicate a time interval between two adjacent preset time periods. Optionally, the third configuration information belongs to the configuration information set.

The communications apparatus 1000 may be the transmission node (or a chip disposed in the transmission node) in any one of the foregoing embodiments. The host and the transmission node are connected in a daisy chain or a circular topology. The processing unit 1002 may support the apparatus 1000 in performing an action of the transmission node in the foregoing method examples, or the processing unit 1002 mainly performs an internal action of the main control device in the foregoing method examples. For example, when the communications apparatus 1000 is a master node in the transmission node, the communications unit 1003 may support communication between the communications apparatus 1000 and another node (for example, a host or a slave node). For another example, when the communications apparatus 1000 is a slave node in the transmission node, the communications unit 1003 may support communication between the communications apparatus 1000 and another node (for example, another slave node).

In an embodiment, the communications unit 1003 is configured to receive first configuration information from a control node, where the first configuration information belongs to a configuration information set, the configuration information set includes at least one piece of configuration information, and the first configuration information is used to indicate whether the first slave node performs, in some or all of time units included in a preset time period, an operation corresponding to the first configuration information; and the processing unit 1002 is configured to: determine, based on the first configuration information, an operation on each time unit included in the preset time period; and perform the determined operation when the time unit is reached.

In a possible design, the first configuration information is a bitmap, and bits included in the bitmap are in a one-to-one correspondence with some or all of the time units included in the preset time period. Any bit included in the bitmap is used to indicate whether to perform, on a corresponding time unit, the operation corresponding to the first configuration information.

In a possible design, the configuration information set includes one or more of the following configuration information: uplink time unit activation information, uplink time unit demodulation information, uplink time unit forwarding information, uplink time unit padding information, downlink time unit activation information, downlink time unit demodulation information, downlink time unit forwarding information, and downlink time unit padding information.

In a possible design, the preset time period includes a downlink time domain resource and/or an uplink time domain resource. The downlink time domain resource includes a time domain resource used to carry a downlink pilot, a time domain resource used to carry a downlink frame header, and a first time unit used to carry downlink regular data; and the uplink time domain resource includes a time domain resource used to carry an uplink pilot and an uplink frame header, and a second time unit used to carry uplink regular data.

In a possible design, the downlink time domain resource further includes a third time unit used to carry downlink feedback information and/or a fourth time unit used to carry burst downlink random data; and the uplink time domain resource further includes a fifth time unit used to carry uplink feedback information and/or a sixth time unit used to carry burst uplink random data.

In a possible design, the communications unit 1003 is configured to receive second configuration information from the control node, where the second configuration information is used to indicate information about at least one fourth time unit; and/or the second configuration information is used to indicate information about at least one sixth time unit. The information includes location information and/or quantity information.

In a possible design, the second configuration information is further used to indicate whether the first slave node activates an overwrite function within the preset period. The overwrite function includes that downlink random data of a second slave node may be overwritten with downlink random data of the first slave node; and/or the overwrite function includes that uplink random data of a third slave node may be overwritten with uplink random data of the first slave node. The control node, the second slave node, the first slave node, and the third slave node are connected in series. The second slave node is an upper-level node of the first slave node, and the third slave node is a lower-level node of the first slave node.

In a possible design, the communications unit 1003 is further configured to: receive second indication information, where the second indication information is used to indicate a first quantity of at least one seventh time unit that does not carry downlink random data in the at least one fourth time unit; and/or receive third indication information, where the third indication information is used to indicate a second quantity of at least one eighth time unit that does not carry uplink random data in the at least one sixth time unit. The control node, the second slave node, the first slave node, and the third slave node are connected in series. The second slave node is an upper-level node of the first slave node, and the third slave node is a lower-level node of the first slave node.

In a possible design, the communications unit 1003 is specifically configured to: receive the second indication information on the time domain resource used to carry a downlink frame header; and receive the third indication information from the third slave node on the time domain resource used to carry an uplink frame header.

In a possible design, the processing unit 1002 is further configured to: pad the uplink random data of the first slave node to one or more time units in the at least one eighth time unit based on the third indication information; and/or if the second configuration information indicates that the overwrite function is activated, pad the uplink random data of the first slave node to one or more time units in at least one ninth time unit, where the at least one ninth time unit is a time unit that has carried uplink random data of at least one third slave node in the at least one sixth time unit.

In a possible design, the processing unit 1002 is specifically configured to: if the second quantity is not less than a third quantity of time units required for the uplink random data of the first slave node, pad the uplink random data to the one or more time units in the eighth time unit; or if the second quantity is less than the third quantity and the second quantity is greater than 0, pad a part of the uplink random data to the eighth time unit.

The ninth time unit further carries information about a first priority of the uplink random data of the third slave node. If a second priority of the uplink random data of the first slave node is higher than the first priority, the processing unit pads a part or all of the uplink random data of the first slave node to the one or more time units in the ninth time unit.

In a possible design, the processing unit 1002 is further configured to: pad the downlink random data of the first slave node to one or more time units in the at least one seventh time unit based on the second indication information; and/or if the second configuration information indicates that the overwrite function is activated, pad the downlink random data of the first slave node to one or more time units in at least one tenth time unit, where the at least one tenth time unit is a time unit that has carried downlink random data of at least one second slave node in the at least one fourth time unit.

In a possible design, the processing unit 1002 is specifically configured to: if the first quantity is not less than a fourth quantity of time units required for the downlink random data of the first slave node, pad the downlink random data to the one or more time units in the seventh time unit; or if the first quantity is less than the fourth quantity and the first quantity is greater than 0, pad a part of the downlink random data to the seventh time unit.

The tenth time unit further carries information about a third priority of the downlink random data of the second slave node. If a second priority of the downlink random data of the first slave node is higher than the third priority, the processing unit pads a part or all of the downlink random data of the first slave node to the one or more time units in the tenth time unit.

In a possible design, the third time unit is in a one-to-one correspondence with the sixth time unit; and at least one third time unit in a current preset time period in two adjacent preset time periods is used to carry downlink feedback information of uplink random data carried in at least one sixth time unit in a previous preset time period, where the downlink feedback information is used to indicate that the uplink random data carried in the at least one sixth time unit is successfully received or not successfully received.

The fifth time unit is in a one-to-one correspondence with the fourth time unit; and at least one fifth time unit in the preset time period is used to carry uplink feedback information of downlink random data carried in at least one fourth time unit in the same preset time period, where the uplink feedback information is used to indicate that the uplink random data carried in the at least one fourth time unit is successfully received or not successfully received.

In a possible design, the communications unit 1003 is further configured to receive third configuration information from the control node, where the third configuration information is used to indicate an identifier of the preset time period, or the third configuration information is used to indicate a time interval between two adjacent preset time periods.

It should be understood that division into units in the foregoing apparatuses is merely logical function division. During actual implementation, all or some of the units may be integrated into one physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, some or all of the units may be integrated together, or the units may be implemented independently. The processing element herein may also be referred to as a processor, and may be an integrated circuit having a signal processing capability. In an implementation process, the steps of the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more application-specific integrated circuits (Application-Specific Integrated Circuit, ASIC), one or more microprocessors (digital signal processor, DSP), one or more field programmable gate arrays (Field Programmable Gate Array, FPGA), or a combination of at least two of these integrated circuit forms. For another example, when the unit in the apparatus is implemented by scheduling a program by a processing element, the processing element may be a processor, for example, a central processing unit (CPU) or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 11:
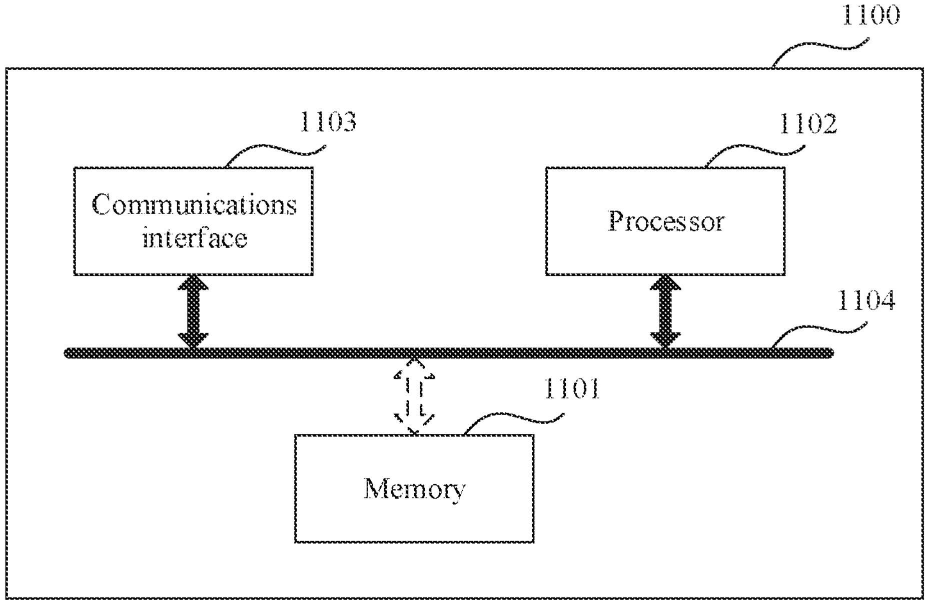
FIG. 11 is a schematic diagram of a structure of another communications apparatus according to an embodiment.

FIG. 11 is a schematic diagram of an apparatus according to an embodiment of this disclosure. The apparatus 1100 may be a control node, a master node, or a slave node in the foregoing embodiments. The apparatus 1100 includes a processor 1102 and a communications interface 1103, and may further include a memory 1101 or have a coupling relationship with the memory 1101. Optionally, the apparatus 1100 may further include a communications line 1104. The communications interface 1103, the processor 1102, and the memory 1101 may be connected to each other through the communications line 1104. The communications line 1104 may be a Peripheral Component Interconnect (PCI) bus, an Extended Industry Standard Architecture (EISA) bus, or the like. The communications line 1104 may be classified into an address bus, a data bus, a control bus, and the like. For ease of representation, only one thick line is used to represent the bus in FIG. 7, but this does not mean that there is only one bus or only one type of bus.

The processor 1102 may be a CPU, a microprocessor, an ASIC, or one or more integrated circuits configured to control program execution in the solutions of this disclosure. A function of the processor 1102 may be the same as that of the processing unit described in FIG. 7.

The communications interface 1103 uses any apparatus like a transceiver, and is configured to communicate with another device or a communications network, such as the Ethernet, a radio access network (RAN), a wireless local area network (WLAN), or a wired access network. A function of the communications interface 1103 may be the same as that of the communications unit described in FIG. 7.

The memory 1101 may be a ROM or another type of static storage device that can store static information and instructions, or may be a RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, this is not limited. The memory may exist independently, and is connected to the processor through the communications line 1104. Alternatively, the memory may be integrated with the processor. A function of the memory 1101 may be the same as that of the storage unit described in FIG. 7.

The memory 1101 is configured to store computer-executable instructions for executing the solutions in this application, and the processor 1102 controls execution of the computer-executable instructions. The processor 1102 is configured to execute the computer-executable instruction stored in the memory 1101, to implement the methods provided in the foregoing embodiments of this disclosure.

Optionally, the compute-executable instruction in the embodiments of this disclosure may also be referred to as application program code. This is not specifically limited in the embodiments of this disclosure.

An embodiment of this disclosure further provides a computer-readable storage medium, configured to store computer software instructions that need to be executed by the foregoing processor. The computer software instructions include a program that needs to be executed by the foregoing processor.

In the embodiments, the term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. In addition, unless otherwise specified, ordinal numbers such as "first" and "second" in the embodiments of this disclosure are used to distinguish between a plurality of objects, but are not intended to limit a sequence, a time sequence, priorities, or importance of the plurality of objects. For example, first data and second data are merely intended to distinguish between different pieces of data, but do not indicate that the two pieces of data have different priorities, different importance degrees, or the like.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer usable storage media (including but not limited to a magnetic disk memory, a CD-ROM, an optical memory, and the like) that store computer usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of the process and/or the block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may also be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded on the computer or another programmable data processing device, so that a series of operation steps are performed on the computer or the another programmable device to produce processing implemented by the computer. Therefore, the instructions executed on the computer or the another programmable device provide steps for implementing the specific function in the one or more processes in the flowcharts and/or in the one or more blocks in the block diagrams.

It is clearly that a person skilled in the art may make various modifications and variations to this disclosure. This disclosure is intended to cover these modifications and variations of this disclosure provided that these modifications and variations fall within the scope of protection defined by the following claims and their equivalent technologies.

What is claimed is:

1. A communications method comprising:

determining, by a control node, first configuration information, wherein the first configuration information belongs to a configuration information set, and wherein the first configuration information indicates, based on a sampling frequency of a first slave node, whether the first slave node is instructed to perform, in time units in a preset time period, an operation corresponding to the first configuration information;

sending, by the control node, the first configuration information to the first slave node; and sending an instruction that uplink random data of a third slave node may be overwritten with uplink random data of the first slave node, wherein the control node is configured to connect to the second slave node, the first slave node, and the third slave node in series.

2. The method of claim 1, wherein the first configuration information comprises a bitmap, wherein bits in the bitmap are in a one-to-one correspondence with the time units in the preset time period, and wherein each bit in the bitmap indicates whether to perform, on a corresponding time unit, the operation corresponding to the first configuration information.

3. The method of claim 1, wherein the configuration information set comprises one or more of uplink time unit activation information, uplink time unit demodulation information, uplink time unit forwarding information, uplink time unit padding information, downlink time unit activation information, downlink time unit demodulation information, downlink time unit forwarding information, or downlink time unit padding information.

4. The method of claim 1, wherein the preset time period comprises at least one of:

a downlink time domain resource, wherein the downlink time domain resource comprises a downlink pilot, a downlink frame header, and a first time unit comprising periodic downlink regular data; or an uplink time domain resource, wherein the uplink time domain resource comprises an uplink pilot, an uplink frame header, and a second time unit comprising periodic uplink regular data.

5. The method of claim 4, wherein the downlink time domain resource further comprises a third time unit comprising downlink feedback information; and/or a fourth time unit comprising burst downlink random data, and wherein the uplink time domain resource further comprises a fifth time unit comprising uplink feedback information; and/or a sixth time unit comprising burst uplink random data.

6. The method of claim 5, further comprising sending, by the control node, second configuration information to the first slave node, wherein the second configuration information comprises location information or quantity information about either the fourth time unit or the sixth time unit.

7. A communications apparatus comprising:

a memory configured to store instructions, and a processor coupled to the memory and configured to execute the instructions to cause the communications apparatus to:

determine first configuration information, wherein the first configuration information belongs to a configuration information set, and wherein the first configuration information indicates, based on a sampling frequency of a first slave node, whether the first slave node is instructed to perform, in time units in a preset time period, an operation corresponding to the first configuration information;

send the first configuration information to the first slave node; and send an instruction that uplink random data of a third slave node may be overwritten with uplink random data of the first slave node, wherein the communications apparatus is configured to connect to a second slave node, the first slave node, and the third slave node in series.

8. The communications apparatus of claim 7, wherein the first configuration information comprises a bitmap, wherein bits in the bitmap are in a one-to-one correspondence with the time units in the preset time period, and wherein each bit in the bitmap indicates whether to perform, on a corresponding time unit, the operation corresponding to the first configuration information.

9. The communications apparatus of claim 7, wherein the configuration information set comprises one or more of: uplink time unit activation information, uplink time unit demodulation information, uplink time unit forwarding information, uplink time unit padding information, downlink time unit activation information, downlink time unit demodulation information, downlink time unit forwarding information, and downlink time unit padding information.

10. The communications apparatus of claim 7, wherein the preset time period comprises at least one of, a downlink time domain resource, wherein the downlink time domain resource comprises a downlink pilot, a downlink frame header, and a first time unit comprising periodic downlink regular data.

11. The communications apparatus of claim 10, wherein the downlink time domain resource further comprises a third time unit comprising downlink feedback information; and/or a fourth time unit comprising burst downlink random data.

12. The communications apparatus of claim 11, wherein the processor is further configured to execute the instructions to cause the communications apparatus to send second configuration information to the first slave node, wherein the second configuration information comprises location information or quantity information about the fourth time unit.

13. The communications apparatus of claim 12, wherein the second configuration information further indicates whether the first slave node activates an overwrite function within the preset time period, wherein the overwrite function comprises an instruction that downlink random data of a second slave node may be overwritten with downlink random data of the first slave node.

14. A first slave node comprising:

a memory configured to store instructions, and a processor coupled to the memory and configured to execute the instructions to cause the first slave node to:

sample, at a sampling frequency, data from a peripheral device;

receive, from a control node, first configuration information, wherein the first configuration information belongs to a configuration information set, and wherein the first configuration information indicates, based on the sampling frequency, whether the first slave node is to perform, in time units in a preset time period, an operation corresponding to the first configuration information;

determine, based on the first configuration information, a determined operation for each time unit in the preset time period;

perform the determined operation for each time unit when each time unit is reached; and receive second configuration information, wherein the second configuration information indicates whether the first slave node is to activate an overwrite function within the preset time period, wherein the overwrite function comprises an instruction that uplink random data of a third slave node may be overwritten with uplink random data of the first slave node, and wherein the first slave node is configured to connect to the control node, a second slave node, and the third slave node in series.

15. The first slave node of claim 14, wherein the first configuration information comprises a bitmap, wherein bits in the bitmap are in a one-to-one correspondence with the time units in the preset time period; and wherein each bit in the bitmap indicates whether to perform, on a corresponding time unit, the operation corresponding to the first configuration information.

16. The first slave node of claim 14, wherein the configuration information set comprises one or more of: uplink time unit activation information, uplink time unit demodulation information, uplink time unit forwarding information, uplink time unit padding information, downlink time unit activation information, downlink time unit demodulation information, downlink time unit forwarding information, or downlink time unit padding information.

17. The first slave node of claim 14, wherein the preset time period comprises at least one of, an uplink time domain resource, wherein the uplink time domain resource comprises an uplink pilot, an uplink frame header, and a second time unit comprises uplink regular data.

18. The first slave node of claim 17, wherein the uplink time domain resource further comprises a fifth time unit comprising uplink feedback information; and/or a sixth time unit comprising burst uplink random data.

19. The first slave node of claim 18, wherein the processor is further configured to execute the instructions to cause the first slave node to receive second configuration information from the control node, wherein the second configuration information comprises location information or quantity information about the sixth time unit.

20. The first slave node of claim 19, wherein the second configuration information further indicates whether the first slave node is to activate an overwrite function within the preset time period, and wherein the overwrite function comprises an instruction that downlink random data of the second slave node may be overwritten with downlink random data of the first slave node.

* * * * *